(12) United States Patent
Kashima

(10) Patent No.: US 12,513,247 B2
(45) Date of Patent: Dec. 30, 2025

(54) COMMUNICATION MANAGEMENT DEVICE, COMMUNICATION MANAGEMENT METHOD, COMMUNICATION MANAGEMENT PROGRAM, AND COMMUNICATION MANAGEMENT SYSTEM

(71) Applicant: ITALL INC., Tokyo (JP)

(72) Inventor: Yusuke Kashima, Tokyo (JP)

(73) Assignee: ITALL INC., Tokyo (JP)

( * ) Notice: Subject to any disclaimer, the term of this patent is extended or adjusted under 35 U.S.C. 154(b) by 383 days.

(21) Appl. No.: 18/247,074

(22) PCT Filed: Mar. 2, 2021

(86) PCT No.: PCT/JP2021/008023
§ 371 (c)(1),
(2) Date: Mar. 29, 2023

(87) PCT Pub. No.: WO2022/074857
PCT Pub. Date: Apr. 14, 2022

(65) Prior Publication Data
US 2024/0022667 A1 Jan. 18, 2024

(30) Foreign Application Priority Data
Oct. 6, 2020 (JP) .................................. 2020-169178

(51) Int. Cl.
*H04M 3/00* (2024.01)
*H04M 3/42* (2006.01)
(Continued)

(52) U.S. Cl.
CPC ......... *H04M 3/58* (2013.01); *H04M 3/42025* (2013.01); *H04Q 3/58* (2013.01)

(58) Field of Classification Search
CPC ......... H04W 88/06; H04W 4/02; H04W 4/50; H04W 84/12; H04W 28/02; H04W 4/18;
(Continued)

(56) References Cited

U.S. PATENT DOCUMENTS

2009/0003316 A1* 1/2009 Lee ..................... H04L 12/5692
370/352
2010/0220850 A1* 9/2010 Gisby .................. H04L 63/061
379/211.02
(Continued)

FOREIGN PATENT DOCUMENTS

JP H591552 A 4/1993
JP H6253022 A 9/1994
(Continued)

OTHER PUBLICATIONS

International Search Report in PCT/JP2021/008023, mailed May 11, 2021. 5pp.

*Primary Examiner* — Kharye Pope
(74) *Attorney, Agent, or Firm* — HAUPTMAN HAM, LLP

(57) ABSTRACT

A communication management device includes an incoming call control unit that transmits an extension incoming call instruction to extension telephone terminals when a mobile incoming call instruction transmitted from mobile phone terminals is input, and based on an incoming call response instruction transmitted from the extension telephone terminals, transmits the incoming call response instruction to the mobile phone terminals; an outgoing call control unit that causes the mobile phone terminals to perform call-requesting outgoing call processing for an external telephone terminal based on an extension call request transmitted from the extension telephone terminals, and transmits an extension outgoing call response instruction to the extension telephone terminals when a mobile outgoing call response
(Continued)

instruction transmitted from the mobile phone terminals is input; and a communication control unit that performs voice communication control between the external telephone terminal and the extension telephone terminals via the mobile phone terminals.

13 Claims, 10 Drawing Sheets

(51) Int. Cl.
*H04M 3/58* (2006.01)
*H04M 5/00* (2006.01)
*H04Q 3/58* (2006.01)

(58) Field of Classification Search
CPC ... H04W 84/042; H04W 28/12; H04W 92/02; H04W 88/16; H04W 84/16; H04W 76/10; H04M 3/42314; H04M 7/006; H04M 15/49; H04M 3/423; H04M 3/56; H04M 2207/18; H04M 2207/20; H04M 3/42229; H04M 1/2535; H04M 1/006; H04M 3/546; H04M 7/0075; H04Q 2213/1322; H04Q 2213/13282; H04Q 2213/13286
See application file for complete search history.

(56) References Cited

U.S. PATENT DOCUMENTS

| | | | | |
|---|---|---|---|---|
| 2011/0195694 A1* | 8/2011 | Midtun | ................ | H04M 3/546 455/414.1 |
| 2011/0281580 A1* | 11/2011 | Tonogai | ............ | H04M 3/42314 455/426.1 |
| 2012/0220281 A1* | 8/2012 | Chandan | ................. | H04W 8/26 455/418 |

FOREIGN PATENT DOCUMENTS

| | | | |
|---|---|---|---|
| JP | H846691 | A | 2/1996 |
| JP | H8116565 | A | 5/1996 |
| JP | H1023161 | A | 1/1998 |
| JP | H11234715 | A | 8/1999 |
| JP | 2002359683 | A | 12/2002 |
| JP | 2006135505 | A | 5/2006 |
| JP | 2006339763 | A | 12/2006 |
| JP | 2007135159 | A | 5/2007 |
| JP | 2007166063 | A | 6/2007 |
| JP | 2007243264 | A | 9/2007 |
| JP | 200811579 | A | 1/2008 |
| JP | 200988835 | A | 4/2009 |
| JP | 201041148 | A | 2/2010 |
| JP | 201041149 | A | 2/2010 |
| JP | 201182794 | A | 4/2011 |
| JP | 2018152718 | A | 9/2018 |
| JP | 6765702 | B1 | 10/2020 |
| JP | 6796349 | B1 | 12/2020 |
| JP | 6812047 | B1 | 1/2021 |
| WO | 2021182197 | A1 | 9/2021 |

* cited by examiner

FIG. 2

MOBILE PHONE COMMUNICATION MANAGEMENT TABLE

| MAC ADDRESS | MOBILE PHONE NUMBER | CALL ID |
|---|---|---|
| ab:cd:ef:gh:ij:aa | 090-aaaa-aaaa | xx |
| ab:cd:ef:gh:ij:bb | 090-bbbb-bbbb | |
| ab:cd:ef:gh:ij:cc | 090-cccc-cccc | |

FIG. 3

EXTENSION COMMUNICATION MANAGEMENT TABLE

| GATEWAY NUMBER | EXTENSION NUMBER | MOBILE PHONE NUMBER | INITIAL CONNECTION |
|---|---|---|---|
| GW01 | N01 | 090-aaaa-aaaa | ○ |
| | | 090-bbbb-bbbb | × |
| | | 090-cccc-cccc | × |
| | N02 | 090-aaaa-aaaa | × |
| | | 090-bbbb-bbbb | ○ |
| | | 090-cccc-cccc | × |
| | N03 | 090-aaaa-aaaa | × |
| | | 090-bbbb-bbbb | × |
| | | 090-cccc-cccc | ○ |
| GW02 | N01 | 090-dddd-dddd | × |
| | | 090-eeee-eeee | × |
| | | 090-ffff-ffff | × |
| | N02 | 090-dddd-dddd | × |
| | | 090-eeee-eeee | × |
| | | 090-ffff-ffff | × |

FIG. 4

CALL MANAGEMENT TABLE

| CALL ID | EXTENSION NUMBER | MOBILE PHONE NUMBER | GATEWAY NUMBER |
|---------|------------------|---------------------|----------------|
| XX | N01 | 090-aaaa-aaaa | GW01 |
| ZZ | N02 | 090-eeee-eeee | GW02 |

COMMUNICATION MANAGEMENT DEVICE, COMMUNICATION MANAGEMENT METHOD, COMMUNICATION MANAGEMENT PROGRAM, AND COMMUNICATION MANAGEMENT SYSTEM

RELATED APPLICATIONS

The present application is National Phase of International Application Number PCT/JP2021/008023, filed Mar. 2, 2021, and claims priority based on Japanese Patent Application No. 2020-169178, filed Oct. 6, 2020.

FIELD

The present invention relates to a communication management device, a communication management method, a communication management program, and a communication management system.

BACKGROUND

Conventionally, for example, a communication management system is used that performs communication management between an external telephone terminal and an extension telephone terminal in an office or the like (for example, see Patent Literature 1).

In such a communication management system, an external telephone network to which the external telephone terminal is connected and the extension telephone terminal are connected by a wired telephone line. The extension telephone terminal performs incoming call processing at the time of an incoming call, and the extension telephone terminal makes an outgoing call to the external telephone terminal at the time of an outgoing call.

CITATION LIST

Patent Literature

Patent Literature 1: Japanese Patent Application Laid-open No. H5-91552

SUMMARY

Technical Problem

However, the communication management system as described above is a system fixed by the wired telephone line, which means that there is little flexibility in the use of the extension telephone terminal.

In view of the above description, it is an object of the present invention to provide a communication management device, a communication management method, a communication management program, and a communication management system that can improve the convenience of communication between an external telephone terminal and an extension telephone terminal.

Solution to Problem

To achieve the above object, the present invention provides the following means.

The present invention is a communication management device that is connected between a mobile phone terminal connected to an external telephone terminal and an extension telephone terminal, and that causes the external telephone terminal and the extension telephone terminal to perform a call with each other via the mobile phone terminal, the communication management device including:

an incoming call control unit that transmits an extension incoming call instruction to the extension telephone terminal to cause the extension telephone terminal to perform incoming call processing when an external call request transmitted from the external telephone terminal is input to the mobile phone terminal to input a mobile incoming call instruction transmitted from the mobile phone terminal, and based on an incoming call response instruction transmitted from the extension telephone terminal, transmits the incoming call response instruction to the mobile phone terminal;

an outgoing call control unit that causes the mobile phone terminal to perform call-requesting outgoing call processing for the external telephone terminal based on an extension call request transmitted from the extension telephone terminal, and transmits an extension outgoing call response instruction to the extension telephone terminal when an external outgoing call response transmitted from the external telephone terminal is input to the mobile phone terminal to input a mobile outgoing call response instruction transmitted from the mobile phone terminal;

a voice information conversion unit that converts mobile voice information in the mobile phone terminal and extension voice information in the extension telephone terminal into each other; and a communication control unit that performs voice communication control between the external telephone terminal and the extension telephone terminal via the mobile phone terminal by causing the voice information conversion unit to convert the mobile voice information and the extension voice information into each other when the incoming call control unit or the outgoing call control unit establishes a call connection between the external telephone terminal and the extension telephone terminal.

Advantageous Effects of Invention

According to one aspect of the present application, the convenience of communication between the external telephone terminal and the extension telephone terminal can be improved.

BRIEF DESCRIPTION OF DRAWINGS

FIG. 2 is an explanatory diagram illustrating a mobile phone communication management table.

FIG. 3 is an explanatory diagram illustrating an extension communication management table.

FIG. 4 is an explanatory diagram illustrating a call management table.

DESCRIPTION OF EMBODIMENTS

Embodiment

The following describes a communication management device, a communication management method, a communication management program, and a communication management system in an embodiment of the present invention.

Figure 1:
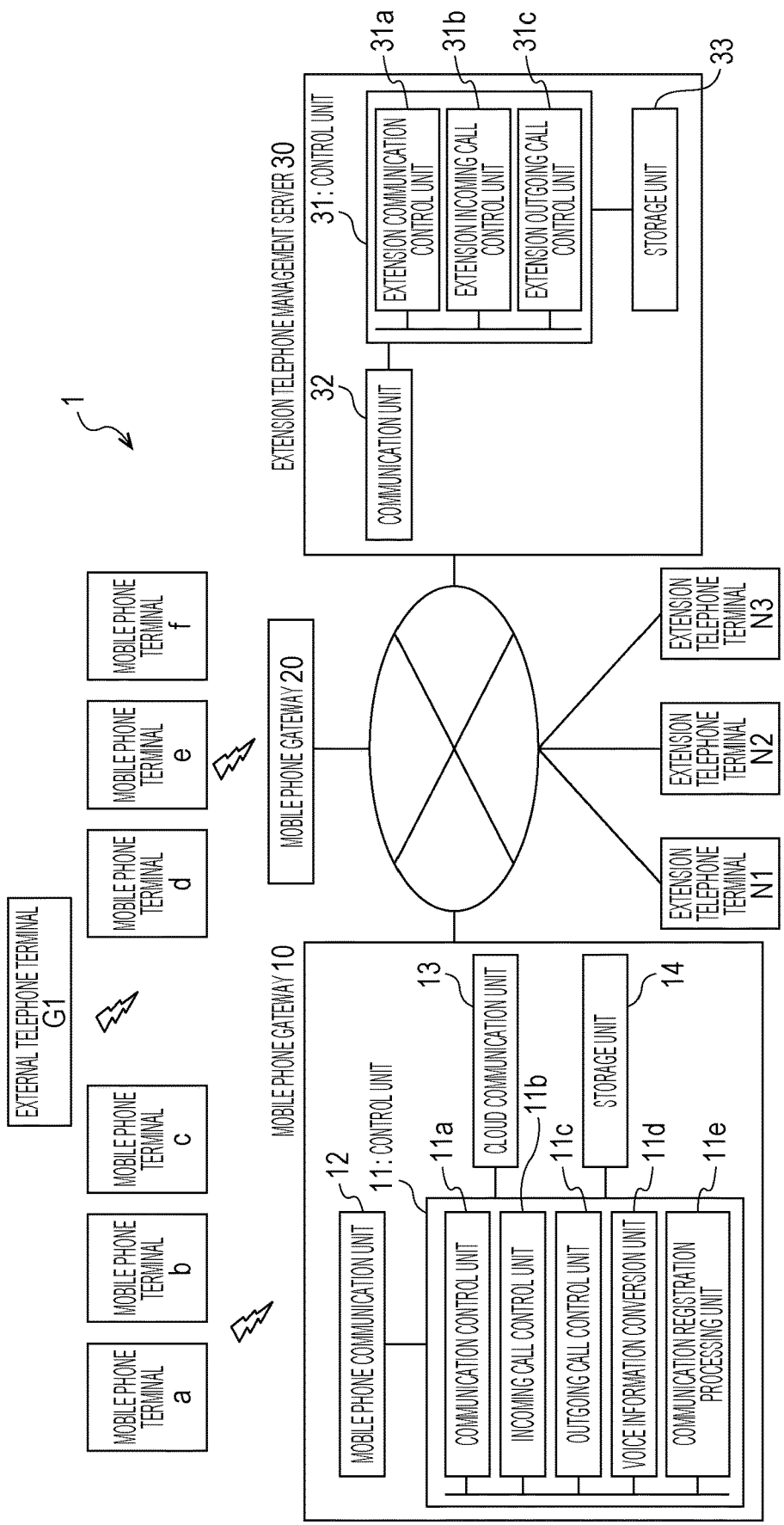
FIG. 1 is an overall configuration diagram illustrating a communication management system as an embodiment of the present invention.

FIG. 1 is an overall configuration diagram illustrating a communication management system 1 as the embodiment of the present invention.

The communication management system 1 includes mobile phone gateways 10 and 20 (communication management devices), an extension telephone management server 30 (communication management server), extension telephone terminals N1 to N3, mobile phone terminals a to f, and an external telephone terminal G1.

The mobile phone gateways 10 and 20, the extension telephone management server 30, and the extension telephone terminals N1 to N3 are connected to each other via a network.

In FIG. 1, between the mobile phone gateways 10 and 20, only a configuration of the mobile phone gateway 10 is illustrated and a configuration of the mobile phone gateway 20 is omitted for the sake of convenience. It goes without saying that the configurations of these mobile phone gateways 10 and 20 are the same.

Since the configurations of the mobile phone gateways 10 and 20 are the same, only the configuration of the mobile phone gateway 10 will be described here.

The mobile phone gateway 10 is connected between the mobile phone terminals a to f and the extension telephone terminals N1 to N3 to allow the external telephone terminal G1 and the extension telephone terminals N1 to N3 to perform a call with each other via the mobile phone terminals a to f. Specifically, the mobile phone gateway 10 is connected between the mobile phone terminals a to f and the extension telephone management server 30.

The mobile phone gateway 10 includes a control unit 11, a mobile phone communication unit 12, a cloud communication unit 13, and a storage unit 14 (mobile information storage unit).

The control unit 11 is achieved by, for example, a processor, a CPU, or other computation means, and functions in cooperation with various memories, hard disks, or other storage means, to execute various programs. This control unit 11 includes a communication control unit 11a, an incoming call control unit 11b, an outgoing call control unit 11c, a voice information conversion unit 11d, and a communication registration processing unit 11e.

The communication control unit 11a executes various programs to control various constituent units and each functional unit and control the entire device. The communication control unit 11a also performs voice communication control between the external telephone terminal G1 and the extension telephone terminals N1 to N3 via the mobile phone terminals a to f in a state in which a call connection is established between the external telephone terminal G1 and the extension telephone terminals N1 to N3. Note that the voice communication control refers to controlling transmission and reception of voice information.

The incoming call control unit 11b establishes the call connection between the external telephone terminal G1 and the extension telephone terminals N1 to N3 in a case where an external call request is received from the external telephone terminal G1. Note that the external call request is a request from the external telephone terminal G1 to initiate a call to the extension telephone terminals N1 to N3. In addition, the call connection means that the external telephone terminal G1 and the extension telephone terminals N1 to N3 can perform a call with each other by transmitting and receiving a call request and a response to and from each other.

When a mobile incoming call instruction transmitted from the mobile phone terminals a to f is input to this incoming call control unit 11b, the incoming call control unit 11b generates a call ID and stores the call ID and a mobile phone number in association with each other in a mobile phone communication management table illustrated in FIG. 2. The incoming call control unit 11b then transmits an extension incoming call instruction to all the registered extension telephone terminals N1 to N3 via the extension telephone management server 30 to cause them to perform incoming call processing. Note that the incoming call processing refers to a process of performing an operation of notifying a user of an incoming call by, for example, sound, vibration, or light.

Furthermore, based on an incoming call response instruction transmitted from the extension telephone terminals N1 to N3, the incoming call control unit 11b transmits the incoming call response instruction to the mobile phone terminals a to f that have transmitted the mobile incoming call instruction to cause the mobile phone terminal to perform incoming call response processing. In other words, when the incoming call response instruction transmitted from the extension telephone terminals N1 to N3 via the extension telephone management server 30 is input to the incoming call control unit 11b, the incoming call control unit 11b transmits the incoming call response instruction to the mobile phone terminals a to f that have transmitted the mobile incoming call instruction.

Note that the incoming call response instruction indicates that the extension telephone terminals N1 to N3 perform response processing in response to the incoming call instruction by a response operation by the user, such as picking up the phone.

In addition, the incoming call response processing refers to a process of responding to the external call request transmitted from the external telephone terminal G1 to initiate a call, and a process of transmitting an incoming call response to a mobile communication network. A destination to which the mobile phone terminals a to f transmit the incoming call response may be a radio base station or the external telephone terminal G1 via the radio base station.

The outgoing call control unit 11c establishes the call connection between the external telephone terminal G1 and the extension telephone terminals N1 to N3 in a case where an extension call request is received from the extension telephone terminals N1 to N3. Note that the extension call request is a request from the extension telephone terminals N1 to N3 to initiate a call to the external telephone terminal G1.

Based on the extension call request transmitted from the extension telephone terminals N1 to N3, this outgoing call control unit 11c transmits a call-requesting outgoing call instruction to the corresponding mobile phone terminals a to f to cause the mobile phone terminal to perform call-requesting outgoing call processing for the external telephone terminal. Note that the call-requesting outgoing call processing refers to a process of calling the external telephone terminal, i.e., a process of transmitting a call request to the external telephone terminal corresponding to an external telephone number.

In addition, when a mobile outgoing call response instruction transmitted from the mobile phone terminals a to f is input to the outgoing call control unit 11c, the outgoing call control unit 11c transmits an extension outgoing call response instruction to the extension telephone terminals N1 to N3 that have transmitted the extension call request via the extension telephone management server 30.

The voice information conversion unit 11d performs a process of converting mobile voice information and extension voice information into each other. The mobile voice information is voice information composed of voice signals processed in the mobile phone terminals a to f. In addition, the extension voice information is voice information composed of voice signals processed in the extension telephone terminals N1 to N3.

When an activation signal transmitted from the mobile phone terminals a to f is input to the communication registration processing unit 11e, the communication registration processing unit 11e extracts mobile phone numbers from a storage unit 33 of the extension telephone management server 30 (described later) and stores the mobile phone numbers in the storage unit 14. In other words, when the activation signal transmitted from the mobile phone terminals a to f is input to the communication registration processing unit 11e, the communication registration processing unit 11e transmits a mobile phone number request to the extension telephone management server 30, and when the mobile phone numbers transmitted from the extension telephone management server 30 are input, stores the mobile phone numbers in the storage unit 14. In addition, when a mobile phone number request transmitted from the mobile phone terminals a to f is input to the communication registration processing unit 11e, the communication registration processing unit 11e reads out the mobile phone communication management table illustrated in FIG. 2, determines whether the mobile phone numbers are registered in association with MAC addresses (or BD addresses), extracts only the mobile phone numbers that are not registered in association, and transmits the mobile phone numbers to the mobile phone terminals a to f. When determining that all the mobile phone numbers have been registered in association with the MAC addresses (or the BD addresses), the communication registration processing unit 11e transmits a registration finish signal to the mobile phone terminals a to f. Furthermore, when a mobile phone number registration instruction, a mobile phone number, and a MAC address (or a BD address) transmitted from the mobile phone terminals a to f are input to the communication registration processing unit 11e, the communication registration processing unit 11e stores the MAC address (or the BD address) and the mobile phone number in the storage unit 14 in association with each other as illustrated in the mobile phone communication management table in FIG. 2.

The mobile phone communication unit 12 includes, for example, various communication devices that transmit and receive information to and from external equipment, and performs wireless communication using a communication standard such as BLUETOOTH (registered trademark) and Wi-Fi (registered trademark), or wired communication with the mobile phone terminals a to c.

The cloud communication unit 13 includes, for example, various communication devices that transmit and receive information to and from external equipment, and communicates with the extension telephone management server 30 via the network such as the Internet. Note that the cloud communication unit 13 may perform wired communication or wireless communication using Wi-Fi (registered trademark) or the like.

The storage unit 14 includes, for example, a hard disk or a memory, and stores various programs, working data, and the like as well as setting screen information for registering the mobile phone numbers. In addition, the storage unit 14 stores the mobile phone communication management table illustrated in FIG. 2.

In the mobile phone communication management table, the MAC address (or the BD address), the mobile phone number, and the call ID are associated with each other. Note that the MAC address is identification information that is uniquely assigned to the mobile phone terminals a to f, and is mobile phone identification information for identifying each of the mobile phone terminals a to f. Similarly, the Bluetooth device address (BD address) is identification information that is uniquely assigned to the mobile phone terminals a to f, and is mobile phone identification information for identifying each of the mobile phone terminals a to f.

In addition, the mobile phone number refers to the phone numbers of the mobile phone terminals a to f themselves, and functions as mobile identification information for identifying each of the mobile phone terminals a to f.

The extension telephone management server 30 is connected between the mobile phone gateways 10 and 20 and the extension telephone terminals N1 to N3, and performs communication between the mobile phone gateways 10 and 20 and the extension telephone terminals N1 to N3.

The extension telephone management server 30 includes a control unit 31, a communication unit 32, and the storage unit 33 (extension information storage unit).

The control unit 31 is achieved by, for example, a processor, a CPU, or other computation means, and functions in cooperation with various memories, hard disks, or other storage means, to execute various programs. This control unit 31 includes an extension communication control unit 31a, an extension incoming call control unit 31b, and an extension outgoing call control unit 31c.

The extension communication control unit 31a executes various programs to control various constituent units and each functional unit and control the entire device. The extension communication control unit 31a also performs the voice communication control between the external telephone terminal G1 and the extension telephone terminals N1 to N3 via the mobile phone terminals a to f in a state in which the call connection is established between the external telephone terminal G1 and the extension telephone terminals N1 to N3.

Furthermore, when the mobile phone number request transmitted from the communication registration processing units 11e of the mobile phone gateways 10 and 20 is input to the extension communication control unit 31a, the extension communication control unit 31a reads out an extension communication management table, extracts the corresponding mobile phone numbers, and transmits the mobile phone numbers to the mobile phone gateways 10 and 20.

In addition, the extension communication control unit 31a stores gateway numbers, extension numbers, mobile phone numbers, and initial connection information transmitted from a communication service provision management terminal by a prior registration operation by a communication service provision manager, in the storage unit 33 in association with each other as the extension communication management table illustrated in FIG. 3. Note that the gateway number is identification information that is uniquely assigned to the mobile phone gateways 10 and 20, and is management device identification information for identifying each of the mobile phone gateways 10 and 20. In addition, the extension number is identification information that is uniquely assigned to the extension telephone terminals N1 to N3 to identify each of the extension telephone terminals N1 to N3. In other words, the extension number serves as extension identification information.

When the external call request is transmitted from the external telephone terminal G1, the extension incoming call control unit 31b establishes the call connection between the external telephone terminal G1 and the extension telephone terminals N1 to N3.

When the extension incoming call instruction, the external telephone number, the mobile phone number, and the call ID transmitted from the mobile phone gateways 10 and 20 are input to this extension incoming call control unit 31b, the extension incoming call control unit 31b reads out the extension communication management table illustrated in FIG. 3 and extracts the gateway number and the extension number corresponding to the mobile phone number. The extension incoming call control unit 31b then stores the call ID, the extension number, the mobile phone number, and the gateway number in the storage unit 33 in association with each other as illustrated in a call management table in FIG. 4. Note that the external telephone number refers to the telephone number of the outside external telephone terminal that performs a call with the mobile phone terminals a to f. In addition, the call ID is temporarily set for each call connection, and refers to identification information for identifying terminals that perform a call with each other.

In addition, when the incoming call response instruction and the call ID transmitted from the extension telephone terminals N1 to N3 are input to the extension incoming call control unit 31b, the extension incoming call control unit 31b reads out the call management table in FIG. 4 and extracts the gateway number and the mobile phone number corresponding to the call ID. The extension incoming call control unit 31b then transmits the call response instruction, the mobile phone number, and the call ID to the mobile phone gateway 10 corresponding to the gateway number.

When the extension call request is transmitted from the extension telephone terminals N1 to N3, the extension outgoing call control unit 31c establishes the call connection between the external telephone terminal G1 and the extension telephone terminals N1 to N3.

When the extension call request, the external telephone number, the extension number, and the call ID transmitted from the extension telephone terminals N1 to N3 are input to the extension outgoing call control unit 31c, the extension outgoing call control unit 31c reads out the extension communication management table illustrated in FIG. 3, extracts the gateway number and the mobile phone number corresponding to the extension number, and stores the call ID, the extension number, the mobile phone number, and the gateway number in the storage unit 33 in association with each other as illustrated in the call management table in FIG. 4. The extension outgoing call control unit 31c then transmits the call-requesting outgoing call instruction, the external telephone number, the mobile phone number, and the call ID to the mobile phone gateway 10 corresponding to the gateway number.

In addition, when the extension outgoing call response instruction and the call ID transmitted from the mobile phone gateways 10 and 20 are input to the extension outgoing call control unit 31c, the extension outgoing call control unit 31c extracts the extension number from the call ID based on the call management table illustrated in FIG. 4, and transmits the extension outgoing call response instruction and the call ID to the extension telephone terminals N1 to N3 corresponding to this extension number.

The communication unit 32 includes, for example, various communication devices that transmit and receive information to and from external equipment, and communicates with the mobile phone gateways 10 and 20 via the network such as the Internet.

The storage unit 33 includes, for example, a hard disk or a memory, and stores various programs, working data, and the like. In addition, the storage unit 33 stores the extension communication management table illustrated in FIG. 3 and the call management table illustrated in FIG. 4.

In the extension communication management table, the gateway number, the extension number, the mobile phone number, and the initial connection information are associated with each other. This extension communication management table is stored in advance by the extension communication control unit 31a based on the information transmitted from the communication service provision management terminal. Note that the "initial connection" in the extension communication management table is initial connection information that is identified as a default transmission destination of the mobile phone terminals a to f that transmit the call-requesting outgoing call instruction when the extension call request transmitted from the extension telephone terminals N1 to N3 is input to the extension outgoing call control unit 31c.

In the call management table, the call ID, the extension number, the mobile phone number, and the gateway number are associated with each other. The call management table is used temporarily during the call connection.

The extension telephone terminals N1 to N3 include, for example, IP phones or smartphones that can be connected to the network. The extension telephone terminals N1 to N3 transmit the extension call request, the incoming call response instruction, the extension voice information, and the like to the extension telephone management server 30, and perform the incoming call processing.

The mobile phone terminals a to f include, for example, smartphones capable of performing communication using BLUETOOTH (registered trademark), Wi-Fi (registered trademark), or the like. The mobile phone terminals a to f transmit the mobile incoming call instruction, the mobile outgoing call response instruction, and the like to the mobile phone gateways 10 and 20, and perform the call-requesting outgoing call processing under an instruction from the mobile phone gateways 10 and 20.

The external telephone terminal G1 includes a telephone terminal, a smartphone, or the like, and transmits the external call request, an external outgoing call response, and the mobile voice information to the mobile phone terminals a to f.

Next, the registration processing of the mobile phone terminals a to f in the communication management system 1 will be described.

Figure 5:
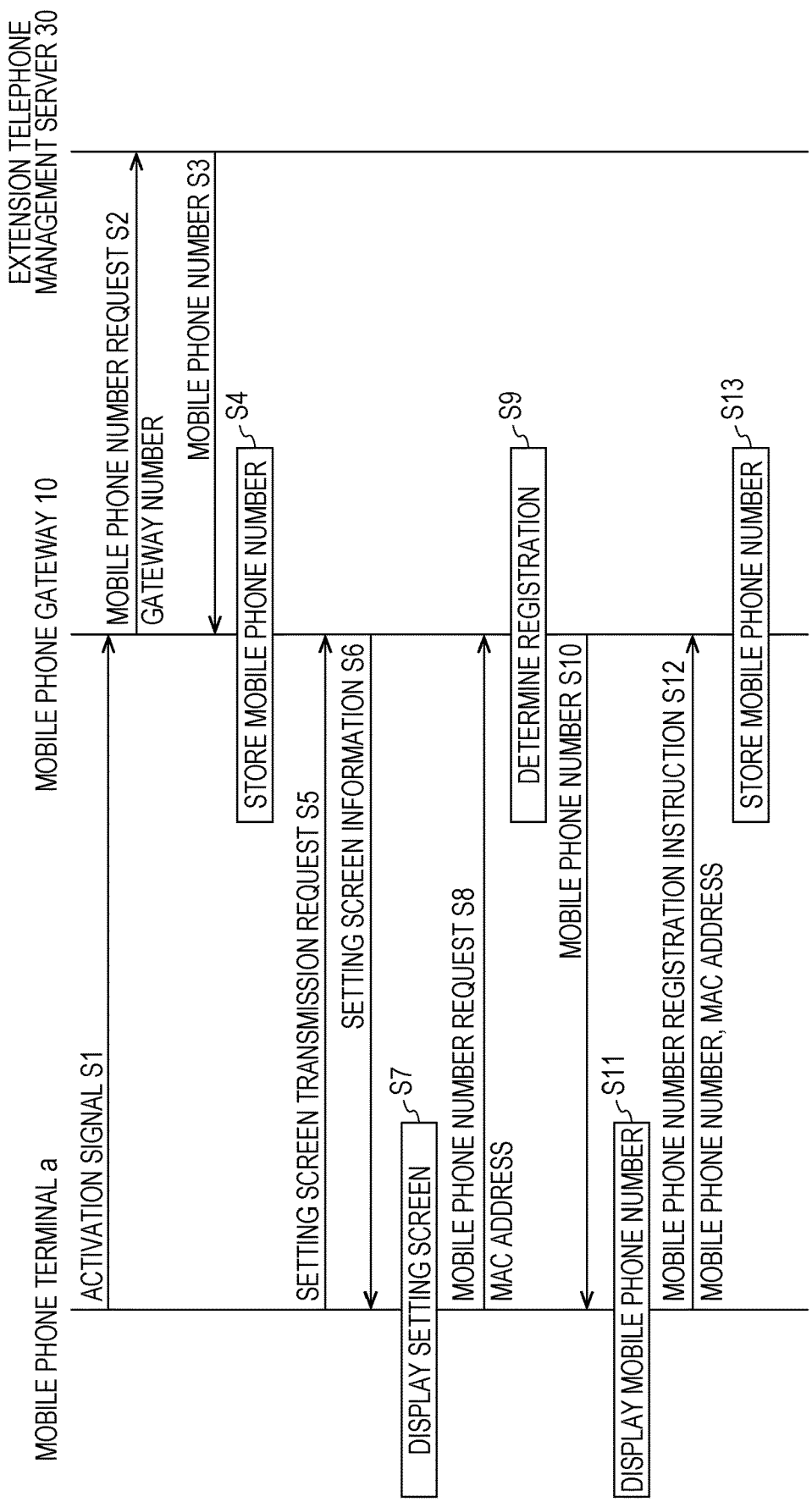
FIG. 5 is a sequence diagram illustrating an operation of registration processing at the time of registering a mobile phone terminal.

FIG. 5 is a sequence diagram illustrating an operation of the registration processing.

For the extension communication management table in FIG. 3, the extension communication control unit 31a stores in advance the gateway numbers, the extension numbers, the mobile phone numbers, and the initial connection information transmitted from the communication service provision management terminal, in the storage unit 33 in association with each other.

Although the communication management system 1 operates in the same manner for all the combinations of the mobile phone terminals a to f and the extension telephone terminals N1 to N3, only the combination of the mobile phone terminal a and the extension telephone terminal N1 will be described here for the convenience of explanation.

When the mobile phone terminal a is activated by an activation operation from a user, the mobile phone terminal a wirelessly transmits the activation signal to the mobile phone gateways 10 and 20 (step S1). The activation signal is a signal transmitted when the mobile phone terminal is activated, and is a mobile identification information extraction instruction signal for extracting the mobile identification information from the storage unit 33 and storing the information in the storage unit 14.

When the activation signal is input to the communication registration processing units 11e of the mobile phone gateways 10 and 20, the communication registration processing units 11e extract the pre-registered mobile phone numbers from the storage unit 33 of the extension telephone management server 30 and store them in the storage units 14. In other words, when the activation signal is input, each of the communication registration processing units 11e extracts its gateway number from the storage unit 14 and transmits the gateway number and the mobile phone number request requesting the pre-registered mobile phone numbers to the extension telephone management server 30 (step S2). When the mobile phone number request and the gateway number are input to the extension communication control unit 31a of the extension telephone management server 30, the extension communication control unit 31a reads out the extension communication management table in FIG. 3, extracts all the mobile phone numbers corresponding to the gateway number, and transmits these mobile phone numbers to the mobile phone gateway 10 or 20 corresponding to the gateway number (step S3). For example, when the gateway number "GW01" is input to the extension communication control unit 31a, the extension communication control unit 31a extracts the corresponding mobile phone numbers "090-aaaa-aaaa" to "090-cccc-cccc" and transmits them to the mobile phone gateway 10. On the other hand, when the gateway number "GW02" is input to the extension communication control unit 31a, the extension communication control unit 31a extracts the corresponding mobile phone numbers "090-dddd-dddd" to "090-ffff-ffff" and transmits them to the mobile phone gateway 20.

When these mobile phone numbers are input to the communication registration processing unit 11e, the communication registration processing unit 11e stores them in the storage unit 14 (step S4).

From this state, the mobile phone terminal a performs the registration processing by a registration operation from the user. In other words, the mobile phone terminal a transmits, to the mobile phone gateway 10, a setting screen transmission request requesting a setting screen to register the mobile phone numbers in the mobile phone gateway 10 (step S5). At this time, the mobile phone terminal a accesses the mobile phone gateway 10 by a LAN connection or the like.

When the setting screen transmission request is input to the communication registration processing unit 11e of the mobile phone gateway 10, the communication registration processing unit 11e reads out the setting screen information for storing the mobile phone numbers of the mobile phone terminals a to f in association with the MAC addresses from the storage unit 14 and transmits the information to the mobile phone terminal a (step S6).

When the setting screen information is input to the mobile phone terminal a, the mobile phone terminal a displays the setting screen on its screen (step S7). When the user performs the mobile phone number registration operation while looking at the setting screen, the mobile phone terminal a transmits the mobile phone number request and the MAC address to the mobile phone gateway 10 (step S8). When the mobile phone number request and the MAC address are input to the communication registration processing unit 11e, the communication registration processing unit 11e reads out all the mobile phone numbers stored in the storage unit 14 and determines whether these pre-stored mobile phone numbers have already been registered in association with the MAC addresses based on the mobile phone communication management table (step S9). When determining that the mobile phone numbers have already been registered in association with the MAC addresses, the communication registration processing unit 11e continues processing without extracting the mobile phone numbers. When determining that the mobile phone numbers have not been registered in association with the MAC addresses, the communication registration processing unit 11e extracts the mobile phone numbers. In other words, the communication registration processing unit 11e extracts only the mobile phone numbers not registered in association with the MAC addresses.

When determining that all the mobile phone numbers stored in the storage unit 14 have already been registered in association with the MAC addresses, the communication registration processing unit 11e transmits the registration finish signal to the mobile phone terminal a and causes the mobile phone terminal a to display that the registration has been finished.

Figure 6:
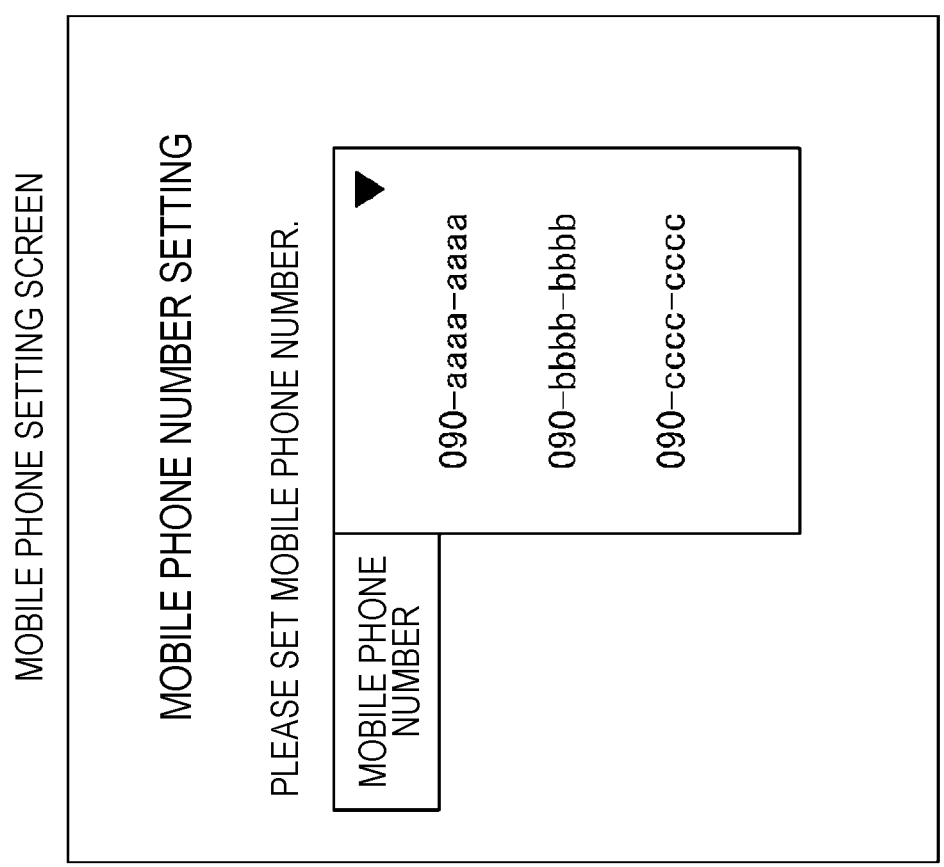
FIG. 6 is an explanatory diagram illustrating the appearance of a setting screen of the mobile phone terminal at step S11 in FIG. 5.

The communication registration processing unit 11e transmits only the mobile phone numbers that have not been registered in association with the MAC addresses to the mobile phone terminal a (step S10) and causes the mobile phone terminal a to display the mobile phone numbers (step S11). In other words, when the communication registration processing unit 11e transmits the mobile phone numbers to the mobile phone terminal a, the mobile phone terminal a displays the mobile phone numbers on its screen, as illustrated in FIG. 6.

When the user performs the registration operation such as selectively touching a given mobile phone number, the mobile phone terminal a transmits the mobile phone number registration instruction, and the mobile phone number and the MAC address by the user's registration operation to the mobile phone gateway 10 (step S12). For example, when the user touches "090-aaaa-aaaa" on the setting screen illustrated in FIG. 6, the mobile phone terminal a transmits the mobile phone number registration instruction, the mobile phone number "090-aaaa-aaaa", and the MAC address "ab:cd:ef:gh:ij:aa" to the mobile phone gateway 10.

When the mobile phone number registration instruction, the mobile phone number, and the MAC address are input to the communication registration processing unit 11e, the communication registration processing unit 11e stores the input MAC address and the input mobile phone number in the storage unit 14 in association with each other as illustrated in the mobile phone communication management table in FIG. 2 (step S13).

Note that these steps S1 to S13 are registration control steps.

The mobile phone terminals a to f are registered in the mobile phone gateways 10 and 20 in this manner.

The following describes the incoming call processing in the communication management system 1.

Figure 7:
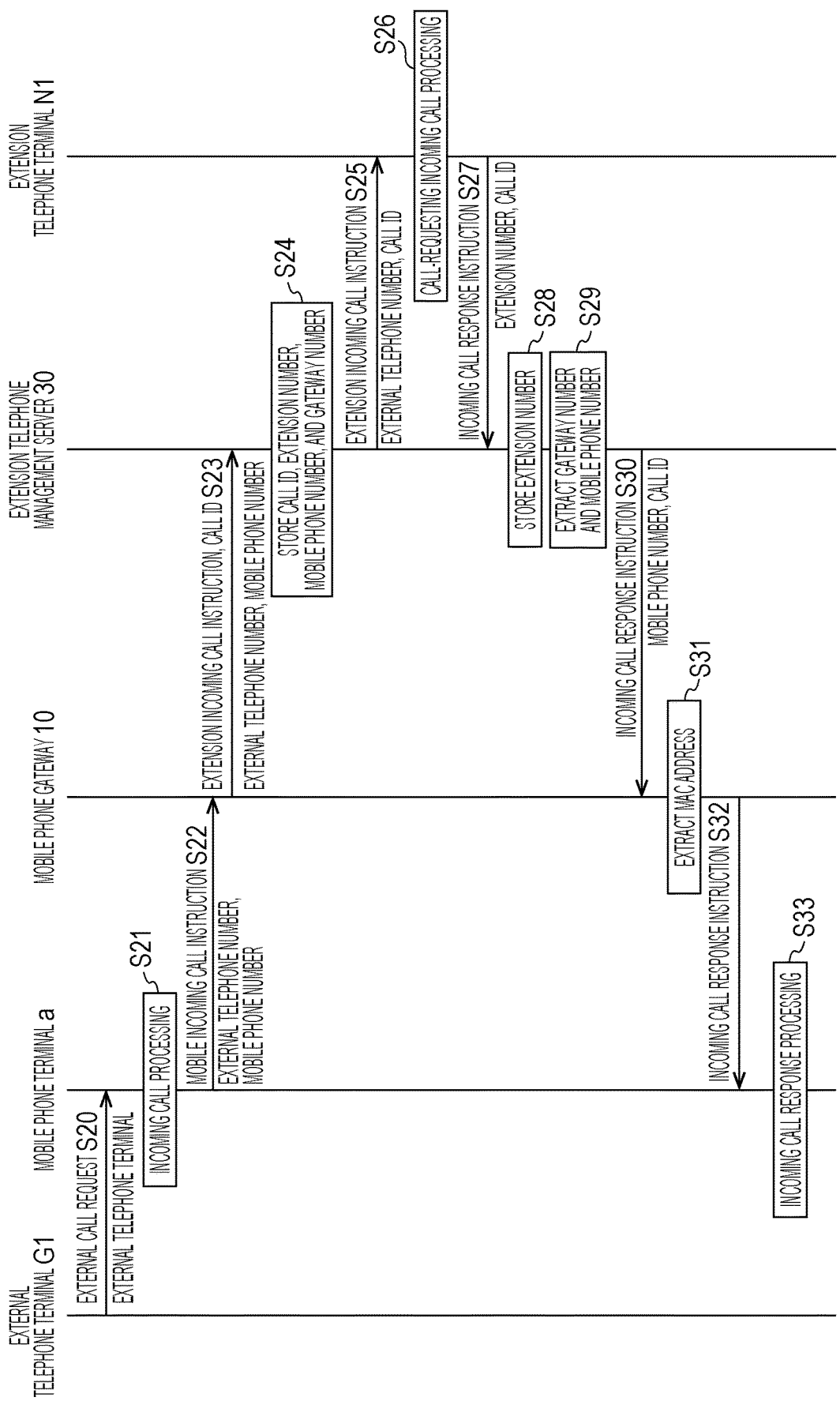
FIG. 7 is a sequence diagram illustrating incoming call processing when the mobile phone terminal receives an incoming call from an external telephone terminal.

FIG. 7 is a sequence diagram illustrating the incoming call processing when the mobile phone terminal a receives an incoming call from the external telephone terminal G1.

It is assumed that the registration processing illustrated in FIG. 5 has been completed for the mobile phone terminals a to f, and that each of the mobile phone terminals a to f is wirelessly connected by BLUETOOTH (registered trademark) to the mobile phone gateway 10 or 20 in which the mobile phone terminal is registered.

Although the communication management system 1 operates in the same manner for all the combinations of the mobile phone terminals a to f, the extension telephone terminals N1 to N3, and the mobile phone gateways 10 and 20, only the combination of the mobile phone terminal a, the extension telephone terminal N1, and the mobile phone gateway 10 will be described here for the convenience of explanation.

First, a user of the external telephone terminal G1 calls the telephone number of the mobile phone terminal a. In other words, the external telephone terminal G1 transmits the external call request and its external telephone number to the mobile phone terminal a (step S20). When the external call request and the external telephone number are input to the mobile phone terminal a, the mobile phone terminal a performs the incoming call processing (step S21). In other words, the mobile phone terminal a displays the external telephone number and emits calling sound. The mobile phone terminal a then transmits the mobile incoming call instruction, the external telephone number, and its mobile phone number to the mobile phone gateway 10 (step S22).

When the mobile incoming call instruction, the external telephone number, and the mobile phone number are input to the incoming call control unit 11b of the mobile phone gateway 10, the incoming call control unit 11b generates the call ID and stores the mobile phone number and the call ID in the storage unit 14 in association with each other in the mobile phone communication management table illustrated in FIG. 2. The incoming call control unit 11b then transmits the extension incoming call instruction to all the corresponding extension telephone terminals N1 to N3 via the extension telephone management server 30 to cause them to perform the incoming call processing. In other words, the incoming call control unit 11b transmits the extension incoming call instruction, the external telephone number, the mobile phone number, and the call ID to the extension telephone management server 30 (step S23).

When the extension incoming call instruction, the external telephone number, the mobile phone number, and the call ID are input to the extension incoming call control unit 31b of the extension telephone management server 30, the extension incoming call control unit 31b reads out the extension communication management table illustrated in FIG. 3 and extracts all the extension numbers and one gateway number corresponding to the mobile phone number. Specifically, the extension incoming call control unit 31b reads out the extension communication management table and extracts all the extension numbers "N01", "N02", and "N03" and the gateway number "GW01" corresponding to the mobile phone number "090-aaaa-aaaa".

The extension incoming call control unit 31b then stores the call ID, the mobile phone number, and the gateway number in association with each other in the call management table illustrated in FIG. 4 (step S24). Specifically, the extension incoming call control unit 31b stores the call ID "XX", the mobile phone number "090-aaaa-aaaa", and the gateway number "GW01" in association with each other in the call management table.

Furthermore, the extension incoming call control unit 31b transmits the extension incoming call instruction, the external telephone number, and the call ID to the extension telephone terminals N1 to N3 corresponding to all the extracted extension numbers (step S25).

When the extension incoming call instruction, the external telephone number, and the call ID are input to the extension telephone terminals N1 to N3, the extension telephone terminals N1 to N3 perform the incoming call processing (step S26). In other words, the extension telephone terminals N1 to N3 display the external telephone number on their screens and emit calling sound.

Here, it is assumed that among the extension telephone terminals N1 to N3, a user of the extension telephone terminal N1 performs an incoming call operation such as picking up the telephone receiver.

The extension telephone terminal N1 transmits the incoming call response instruction to the mobile phone gateway 10 via the extension telephone management server 30. In other words, the extension telephone terminal N1 transmits the incoming call response instruction, its extension number, and the call ID to the extension telephone management server 30 (step S27).

When the incoming call response instruction, the extension number, and the call ID are input to the extension incoming call control unit 31b of the extension telephone management server 30, the extension incoming call control unit 31b stores the extension number in association with the mobile phone number and the gateway number corresponding to the call ID in the call management table illustrated in FIG. 4 (step S28).

Specifically, in the call management table, the extension incoming call control unit 31b stores the call ID "XX", the extension number "N01", the mobile phone number "090-aaaa-aaaa", and the gateway number "GW01" in association with each other. As a result, the call ID, the extension number, the mobile phone number, and the gateway number are stored in association with each other.

Furthermore, the extension incoming call control unit 31b reads out the call management table and extracts the gateway number and the mobile phone number corresponding to the call ID (step S29). Specifically, the extension incoming call control unit 31b reads out the call management table and extracts the mobile phone number "090-aaaa-aaaa" and the gateway number "GW01" corresponding to the call ID "XX".

The extension incoming call control unit 31b then transmits the incoming call response instruction, the mobile phone number, and the call ID to the mobile phone gateway 10 corresponding to the gateway number (step S30).

When the incoming call response instruction, the mobile phone number, and the call ID are input to the incoming call control unit 11b of the mobile phone gateway 10, the incoming call control unit 11b reads out the mobile phone communication management table and extracts the MAC address corresponding to the call ID and the mobile phone number (step S31). Specifically, the incoming call control unit 11b reads out the mobile phone communication management table and extracts the MAC address "ab:cd:ef:gh:ij:aa" corresponding to the call ID "XX" and the mobile phone number "090-aaaa-aaaa".

The incoming call control unit 11b then transmits the incoming call response instruction to the mobile phone terminal a corresponding to the MAC address (step S32).

When the incoming call response instruction is input to the mobile phone terminal a, the mobile phone terminal a performs the incoming call response processing (step S33).

Note that these steps S20 to S33 are incoming call control steps.

As a result, the call connection is established between the external telephone terminal G1 and the extension telephone terminal N1.

The following describes the outgoing call processing in the communication management system 1.

Figure 8:
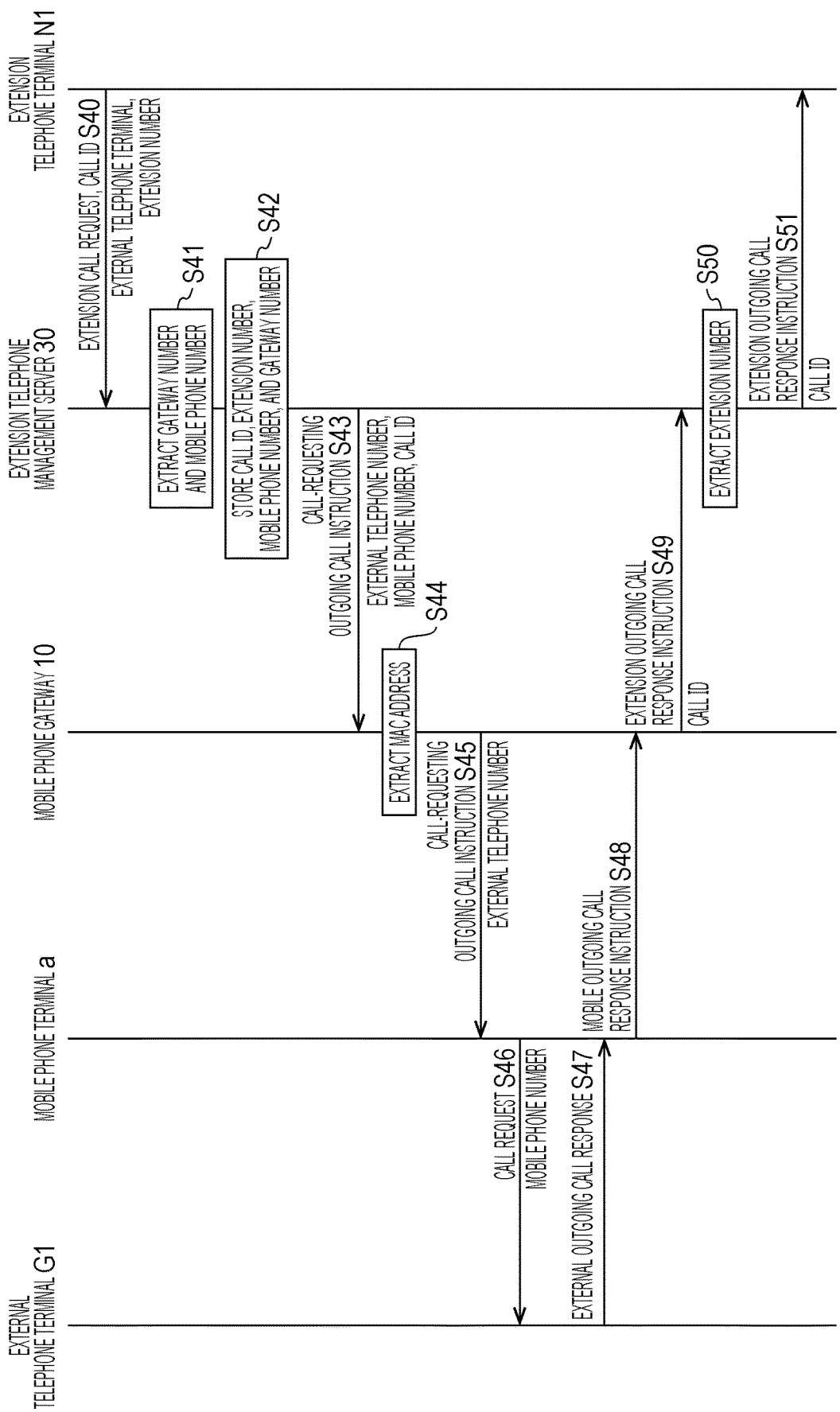
FIG. 8 is a sequence diagram illustrating outgoing call processing when an extension telephone terminal makes an outgoing call to the external telephone terminal via the mobile phone terminal.

FIG. 8 is a sequence diagram illustrating the outgoing call processing when the extension telephone terminal N1 makes an outgoing call to the external telephone terminal via the mobile phone terminal a.

It is assumed that the registration processing illustrated in FIG. 5 has been completed for the mobile phone terminals a to f, and that each of the mobile phone terminals a to f is wirelessly connected by BLUETOOTH (registered trademark) to the mobile phone gateway 10 or 20 in which the mobile phone terminal is registered.

Although the communication management system 1 operates in the same manner for all the combinations of the mobile phone terminals a to f, the extension telephone terminals N1 to N3, and the mobile phone gateways 10 and 20, only the combination of the mobile phone terminal a, the extension telephone terminal N1, and the mobile phone gateway 10 will be described here for the convenience of explanation.

First, the user of the extension telephone terminal N1 calls the external telephone number from the extension telephone terminal N1. In other words, the extension telephone terminal N1 transmits the extension call request to the mobile phone gateway 10 via the extension telephone management server 30 (step S40). That is, the extension telephone terminal N1 transmits the extension call request, the external telephone number, its extension number, and the call ID to the extension telephone management server 30.

When the extension call request, the external telephone number, the extension number, and the call ID are input to the extension outgoing call control unit 31c of the extension telephone management server 30, the extension outgoing call control unit 31c reads out the extension communication management table illustrated in FIG. 3 and extracts the mobile phone number and the gateway number registered as the initial connection from the extension number (step S41). Specifically, the extension outgoing call control unit 31c reads out the extension communication management table and extracts the mobile phone number "090-aaaa-aaaa" and the gateway number "GW01" corresponding to the extension number "N01" and an ON state (○) of the initial connection.

The extension outgoing call control unit 31c then stores the call ID, the extension number, the mobile phone number, and the gateway number in association with each other in the call management table illustrated in FIG. 4 (step S42). Specifically, in the call management table, the extension communication control unit 31a stores the call ID "XX", the extension number "N01", the mobile phone number "090-aaaa-aaaa", and the gateway number "GW01" in association with each other.

Furthermore, the extension outgoing call control unit 31c transmits the call-requesting outgoing call instruction, the external telephone number, the mobile phone number, and the call ID to the mobile phone gateway 10 (step S43).

When the call-requesting outgoing call instruction, the external telephone number, the mobile phone number, and the call ID are input to the outgoing call control unit 11c of the mobile phone gateway 10, the outgoing call control unit 11c stores the call ID in the storage unit 14 in association with the mobile phone number in the mobile phone communication management table illustrated in FIG. 2. The outgoing call control unit 11c then reads out the mobile phone communication management table and extracts the MAC address corresponding to the mobile phone number (step S44). Specifically, the outgoing call control unit 11c reads out the mobile phone communication management table and extracts the MAC address "ab:cd:ef:gh:ij:aa" corresponding to the mobile phone number "090-aaaa-aaaa".

As described above, based on the extension call request, the external telephone number, and the extension number transmitted from the extension telephone terminal N1, the outgoing call control unit 11c extracts the mobile phone number from the storage unit 33 of the extension telephone management server 30 and extracts the MAC address corresponding to the mobile phone number.

The outgoing call control unit 11c then wirelessly transmits the call-requesting outgoing call instruction to the mobile phone terminal a corresponding to the MAC address to cause the mobile phone terminal a to perform the call-requesting outgoing call processing. In other words, the outgoing call control unit 11c transmits the call-requesting outgoing call instruction and the external telephone number to the mobile phone terminal a (step S45).

When the call-requesting outgoing call instruction and the external telephone number are input to the mobile phone terminal a, the mobile phone terminal a performs the call-requesting outgoing call processing. In other words, the mobile phone terminal a transmits the call request and its mobile phone number to the external telephone terminal G1 (step S46).

When the call request and the mobile phone number are input to the external telephone terminal G1, the external telephone terminal G1 performs the call incoming call processing. In other words, the external telephone terminal G1 displays the mobile phone number on its screen and emits calling sound. Upon an incoming call operation by the user of the external telephone terminal G1, the external telephone terminal G1 wirelessly transmits the external outgoing call response to the mobile phone terminal a (step S47).

When the external outgoing call response is input to the mobile phone terminal a, the mobile phone terminal a wirelessly transmits the mobile outgoing call response instruction to the mobile phone gateway 10 (step S48).

When the mobile outgoing call response instruction is input to the outgoing call control unit 11c of the mobile phone gateway 10, the outgoing call control unit 11c transmits the extension outgoing call response instruction to the extension telephone terminal N1 that has transmitted the extension call request via the extension telephone management server 30. In other words, the outgoing call control unit 11c reads out the mobile phone communication management table in FIG. 2, extracts the call ID corresponding to the MAC address, and transmits the extension outgoing call response instruction and the call ID to the extension telephone management server 30 (step S49).

When the extension outgoing call response instruction and the call ID are input to the extension outgoing call control unit 31c of the extension telephone management server 30, the extension outgoing call control unit 31c reads out the call management table illustrated in FIG. 4 and extracts the extension number corresponding to the call ID (step S50). Specifically, the extension outgoing call control unit 31c reads out the call management table and extracts the extension number "N01" corresponding to the call ID "XX".

The extension outgoing call control unit 31c then transmits the extension outgoing call response instruction and the call ID to the extension telephone terminal N1 corresponding to the extension number (step S51).

Note that these steps S40 to S53 are outgoing call control steps.

The extension outgoing call response instruction and the call ID are input to the extension telephone terminal N1. As a result, the call connection is established between the external telephone terminal G1 and the extension telephone terminal N1.

The following describes a process during a call in the communication management system 1.

Figure 9:
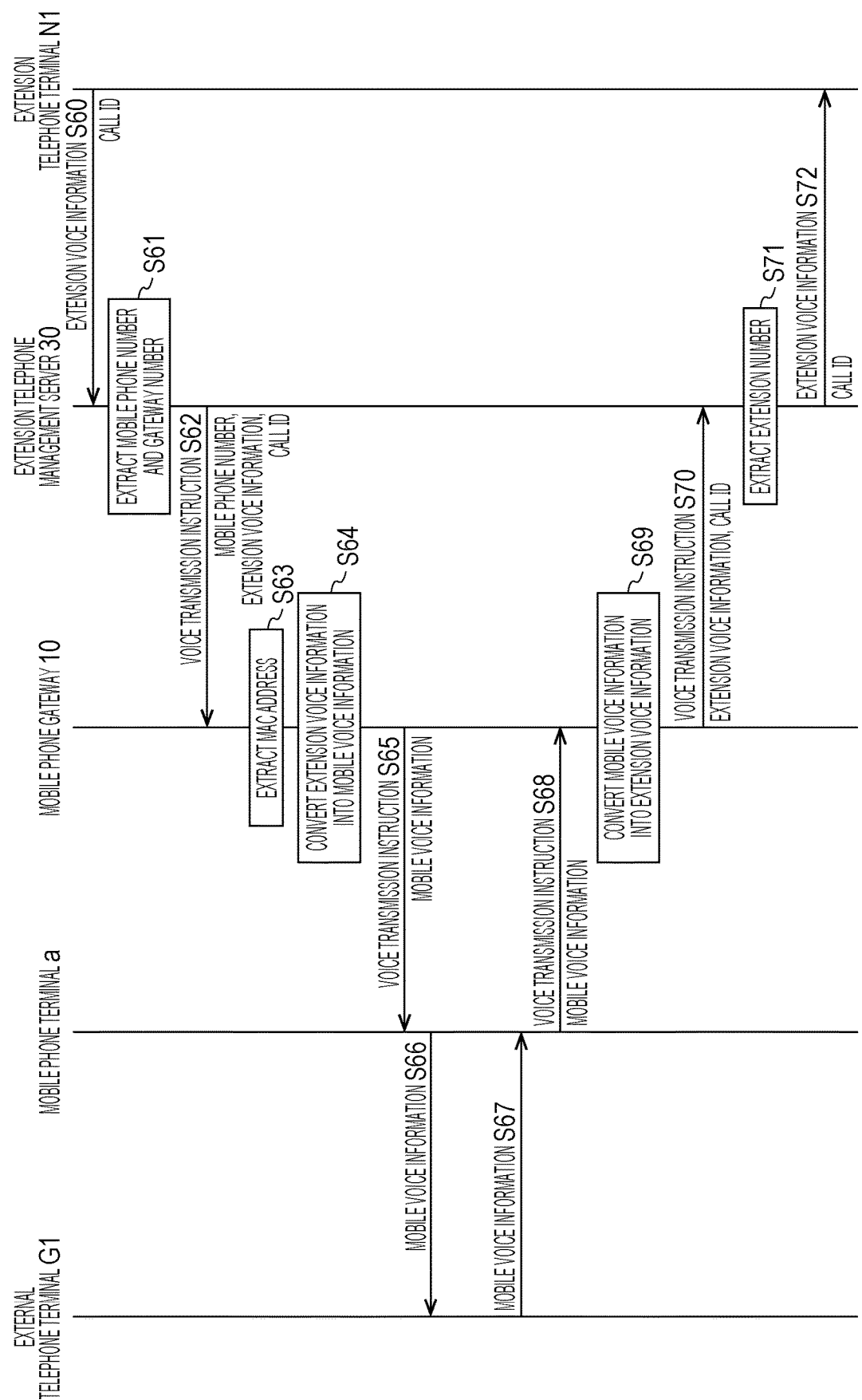
FIG. 9 is a sequence diagram illustrating a process in which the external telephone terminal and the extension telephone terminal perform a call with each other.

FIG. 9 is a sequence diagram illustrating a process in which the external telephone terminal and the extension telephone terminal N1 perform a call with each other.

It is assumed that the call connection processing at the time of the incoming call illustrated in FIG. 7 or the call connection processing at the time of the outgoing call illustrated in FIG. 8 has been completed and that the call connection is established between the external telephone terminal G1 and the extension telephone terminal N1.

Although the communication management system 1 operates in the same manner for all the combinations of the mobile phone terminals a to f, the extension telephone terminals N1 to N3, and the mobile phone gateways 10 and 20, only the combination of the mobile phone terminal a, the extension telephone terminal N1, and the mobile phone gateway 10 will be described here for the convenience of explanation.

The user of the extension telephone terminal N1 speaks into a microphone. The extension telephone terminal N1 inputs the voice, converts the voice into the extension voice information, and transmits the extension voice information to the mobile phone gateway 10 via the extension telephone management server 30. In other words, the extension telephone terminal N1 transmits the extension voice information and the call ID to the extension telephone management server 30 (step S60).

When the extension voice information and the call ID are input to the extension communication control unit 31a of the extension telephone management server 30, the extension communication control unit 31a reads out the call management table illustrated in FIG. 4 and extracts the mobile phone number and the gateway number corresponding to the call ID (step S61). Specifically, the extension communication control unit 31a reads out the communication management table and extracts the mobile phone number "090-aaaa-aaaa" and the gateway number "GW01" corresponding to the call ID "XX".

The extension communication control unit 31a then transmits a voice transmission instruction, the mobile phone number, the extension voice information, and the call ID to the mobile phone gateway 10 corresponding to the gateway number (step S62).

When the voice transmission instruction, the mobile phone number, the extension voice information, and the call ID are input to the communication control unit 11a of the mobile phone gateway 10, the communication control unit 11a reads out the mobile phone communication management table illustrated in FIG. 2 and extracts the MAC address corresponding to the call ID and the mobile phone number (step S63). Specifically, the communication control unit 11a reads out the mobile phone communication management table and extracts the MAC address "ab:cd:ef:gh:ij:aa" corresponding to the call ID "XX" and the mobile phone number "090-aaaa-aaaa". Furthermore, the communication control unit 11a causes the voice information conversion unit 11d to perform the conversion processing from the extension voice information to the mobile voice information. In other words, the communication control unit 11a outputs the extension voice information to the voice information conversion unit 11d. When the extension voice information is input to the voice information conversion unit 11d, the voice information conversion unit 11d converts the extension voice information into the mobile voice information (step S64). The voice information conversion unit 11d then outputs the mobile voice information to the communication control unit 11a. When the mobile voice information is input to the communication control unit 11a, the communication control unit 11a transmits the voice transmission instruction and the mobile voice information to the mobile phone terminal a corresponding to the MAC address (step S65), and causes the mobile phone terminal a to perform mobile voice transmission processing. Note that the mobile voice transmission processing refers to a process of transmitting the mobile voice information to the external telephone terminal. In other words, when the voice transmission instruction and the mobile voice information are input to the mobile phone terminal a, the mobile phone terminal a transmits the mobile voice information to the external telephone terminal G1 (step S66).

When the mobile voice information is input to the external telephone terminal G1, the external telephone terminal G1 emits voice from its speaker based on the mobile voice information.

When the user of the external telephone terminal G1 speaks, the external telephone terminal G1 transmits the mobile voice information to the mobile phone terminal a (step S67).

When the mobile voice information is input to the mobile phone terminal a, the mobile phone terminal a wirelessly transmits the voice transmission instruction and the mobile voice information to the mobile phone gateway 10 (step S68).

When the voice transmission instruction and the mobile voice information are input to the communication control unit 11a of the mobile phone gateway 10, the communication control unit 11a reads out the mobile phone communication management table illustrated in FIG. 2 and extracts the call ID corresponding to the MAC address of the mobile phone terminal a. The communication control unit 11a then causes the voice information conversion unit 11d to perform the conversion processing from the mobile voice information to the extension voice information, and transmits the extension voice information to the extension telephone terminal N1 via the extension telephone management server 30. In other words, the communication control unit 11a outputs the mobile voice information to the voice information conversion unit 11d. When the mobile voice information is input to the voice information conversion unit 11d, the voice information conversion unit 11d converts the mobile voice information into the extension voice information (step S69). The voice information conversion unit 11*d* then outputs the extension voice information to the communication control unit 11*a*. When the extension voice information is input to the communication control unit 11*a*, the communication control unit 11*a* transmits the extension voice information to the extension telephone terminal N1 via the extension telephone management server 30. In other words, the communication control unit 11*a* transmits the voice transmission instruction, the extension voice information, and the call ID to the extension telephone management server 30 (step S70).

When the voice transmission instruction, the extension voice information, and the call ID are input to the extension communication control unit 31*a* of the extension telephone management server 30, the extension communication control unit 31*a* reads out the call management table illustrated in FIG. 4 and extracts the extension number corresponding to the call ID (step S71). Specifically, the extension communication control unit 31*a* extracts the extension number "N01" corresponding to the call ID "XX".

The extension communication control unit 31*a* then transmits the extension voice information and the call ID to the extension telephone terminal N1 (step S72).

When the extension voice information is input to the extension telephone terminal N1, the extension telephone terminal N1 emits voice from a speaker based on the extension voice information.

Note that these steps S60 to S73 are call control steps.

As a result, the external telephone terminal and the extension telephone terminal N1 perform a call with each other via the mobile phone terminal a, the mobile phone gateway 10, and the extension telephone management server 30.

When the user of the extension telephone terminal N1 performs holding and transferring operations during the call connection between the external telephone terminal and the extension telephone terminal N1, the extension telephone terminal N1 performs call holding processing and switches the call connection to, for example, the extension telephone terminal N2. In other words, the extension telephone terminal N1 transmits, to the extension telephone management server 30, a transfer request to the extension telephone terminal N2. When the transfer request is input to the extension communication control unit 31*a* of the extension telephone management server 30, the extension communication control unit 31*a* transmits the transfer request to the extension telephone terminal N2, and the extension telephone terminal N2 performs transfer response processing. As a result, the call connection is established between the external telephone terminal and the extension telephone terminal N2. As described above, each of the extension telephone terminals N1 to N3 can switch the call connection with the external telephone terminal G1 to each other via the extension telephone management server 30 during the call connection with the external telephone terminal G1.

From the above description, according to the communication management system 1 and the mobile phone gateways 10 and 20 in the present embodiment, the extension incoming call control unit 31*b* and the outgoing call control unit 31*c* establish the call connection between the external telephone terminal G1 and the extension telephone terminals N1 to N3 via the mobile phone terminals a to f, and the communication control unit 11*a* performs the voice communication control between the external telephone terminal G1 and the extension telephone terminals N1 to N3 via the mobile phone terminals a to f. As a result, it is possible to increase the locational flexibility of communication connections by the mobile phone terminals a to f, and to improve the convenience of communication between the external telephone terminal and the extension telephone terminals.

In other words, in conventional cases, in order for the external telephone terminal G1 and the extension telephone terminals N1 to N3 to perform a call with each other, the external telephone terminal G1 has to call an office land-line telephone before performing a call with the extension telephone terminals N1 to N3. Thus, the communication connections are locationally limited.

In the communication management system 1 and the mobile phone gateways 10 and 20 in the present embodiment, when the external telephone terminal G1 makes a call, the mobile phone terminals a to f can connect the call to the extension telephone terminals N1 to N3 after performing the mobile incoming call processing. As a result, the locational flexibility of the communication connections can be improved. For example, when a user carries the mobile phone terminals a to f and the mobile phone gateways 10 and 20, it is possible to cause the external telephone terminal G1 and the extension telephone terminals N1 to N3 in the office to perform a call with each other even while the user is out of the office. Therefore, the convenience of communication can be improved. Furthermore, when the user carries the mobile phone terminals a to f and the mobile phone gateways 10 and 20, and another user carries a smartphone, which is the extension telephone terminals N1 to N3, it is possible to not only cause the external telephone terminal G1 and the extension telephone terminals N1 to N3 to perform a call with each other even while the user or the another user is out of the office, but also cause the external telephone terminal G1 and the extension telephone terminals N1 to N3 to perform a call with each other even when at least one of the users of the mobile phone terminals a to f or the extension telephone terminals N1 to N3 stays abroad.

In addition, when the mobile incoming call instruction transmitted from any of the mobile phone terminals a to f is input to the incoming call control unit 11*b*, the incoming call control unit 11b can cause all the registered extension telephone terminals N1 to N3 to perform the incoming call instruction, which further improves the convenience of communication.

In addition, based on the extension number transmitted from any of the extension telephone terminals N1 to N3, the outgoing call control unit 11*c* extracts the mobile phone number associated with the extension number to cause the mobile phone terminals a to f to perform the call-requesting outgoing call processing. As a result, the plurality of mobile phone terminals a to f can be used, and the convenience of communication can be further improved.

In addition, the communication registration processing unit 11*e* stores the MAC addresses and the mobile phone numbers in the storage unit 14 in association with each other, and the outgoing call control unit 11*c* extracts the mobile phone number based on the extension number transmitted from the extension telephone terminals N1 to N3 and extracts the corresponding MAC address. As a result, the plurality of mobile phone terminals a to f can be used, and the convenience of communication can be further improved.

In addition, when the activation signal transmitted from any of the mobile phone terminals a to f is input to the communication registration processing unit 11*e*, the communication registration processing unit 11*e* extracts the mobile phone numbers from the storage unit 33 via the extension telephone management server 30 and stores the mobile phone numbers in the storage unit 14. As a result, it is possible to prevent incorrect registration of the mobile phone number.

Furthermore, when the mobile identification information request transmitted from the mobile phone terminals a to f is input to the communication registration processing unit 11*e*, the communication registration processing unit 11*e* extracts the mobile phone numbers stored in the storage unit 14, causes the mobile phone terminals a to f to display the mobile phone numbers, and when the mobile phone terminals a to f transmit the mobile phone number that is selectively input by the user operation, inputs and stores the mobile phone number in the storage unit 14 in association with the MAC address. As a result, it is possible to prevent incorrect registration of the mobile phone number.

Moreover, when the mobile identification information request transmitted from any of the mobile phone terminals a to f is input to the communication registration processing unit 11*e*, the communication registration processing unit 11*e* determines whether the mobile phone numbers stored in the storage unit 14 are associated with the MAC addresses, extracts only the mobile phone numbers determined to be not associated with the MAC addresses, and causes the mobile phone terminals a to f to display the mobile phone numbers. As a result, it is possible to prevent incorrect registration of the mobile phone number.

It should be noted that the technical scope of the present invention is not limited to the above embodiment, and various changes can be made without departing from the gist of the present invention.

For example, the incoming call control unit lib causes all the registered extension telephone terminals N1 to N3 to perform the incoming call processing. However, the present invention is not limited thereto, and any one of the extension telephone terminals N1 to N3 may be caused to perform the incoming call processing.

The outgoing call control unit 11*c* extracts the mobile phone number associated with the extension number based on the extension call request and the extension number transmitted from the extension telephone terminals N1 to N3. However, the present invention is not limited thereto, and this function may be omitted.

The communication registration processing unit 11*e* stores the MAC addresses and the mobile phone numbers in the storage unit 14 in association with each other. However, the present invention is not limited thereto, and this function may be omitted.

The outgoing call control unit 11*c* extracts the mobile phone number from the storage unit 33 via the extension telephone management server 30 based on the extension number transmitted from the extension telephone terminals N1 to N3, and extracts the MAC address associated with the mobile phone number from the storage unit 14. However, the present invention is not limited thereto, and this function may be omitted.

The incoming call control unit 11*b* or the outgoing call control unit 11*c* does not have to be provided. It is only necessary to provide at least one of them. For example, only the incoming call control unit 11*b* may be provided to perform the incoming call processing, or only the outgoing call control unit 11*c* may be provided to perform the outgoing call processing. In this case, it is only necessary to provide at least one of the extension incoming call control unit 31*b* or the extension outgoing call control unit 31*c* corresponding to either the incoming call control unit 11*b* or the outgoing call control unit 11*c*.

Although the voice information conversion unit 11*d* is provided, the present invention is not limited thereto, and the voice information conversion unit 11*d* does not have to be provided.

When the activation signal transmitted from any of the mobile phone terminals a to f is input to the communication registration processing unit 11*e*, the communication registration processing unit 11*e* extracts the mobile phone numbers from the storage unit 33 via the extension telephone management server 30 and stores them in the storage unit 14. However, the present invention is not limited thereto, and this function may be omitted.

Although the activation signal is used as the mobile identification information extraction instruction signal, the present invention is not limited thereto. The mobile identification information extraction instruction signal may be transmitted from any of the mobile phone terminals a to f at any timing by a user operation. In other words, when the mobile identification information extraction instruction signal is transmitted from any of the mobile phone terminals a to f at any timing by the user operation (step S1), the communication registration processing unit 11*e* stores the mobile identification information in the storage unit 14 in the same manner as in steps S2 to S4. In a case where the mobile phone number is used as the mobile identification information, the mobile identification information extraction instruction signal may be a mobile phone number extraction instruction signal.

When the mobile identification information request transmitted from any of the mobile phone terminals a to f is input to the communication registration processing unit 11*e*, the communication registration processing unit 11*e* extracts the mobile phone numbers stored in the storage unit 14 and causes the mobile phone terminals a to f to display the mobile phone numbers. However, the present invention is not limited thereto, and this function may be omitted.

When the mobile identification information request transmitted from any of the mobile phone terminals a to f is input to the communication registration processing unit 11*e*, the communication registration processing unit 11*e* determines whether the mobile phone numbers stored in the storage unit 14 are associated with the MAC addresses, extracts only the mobile phone numbers not associated with the MAC addresses, and causes the mobile phone terminals a to f to display the mobile phone numbers. However, the present invention is not limited thereto, and this function may be omitted.

Although the extension number is used as the extension identification information, the present invention is not limited thereto, and another identification information may be used. The mobile phone numbers of the mobile phone terminals a to f, the MAC addresses, the BD addresses, or the like may be used.

Although the MAC address is used as the mobile phone identification information, the present invention is not limited thereto, and another identification information may be used. For example, the mobile phone identification information may be the BD address or an IP address or the like. In other words, the mobile phone communication management table illustrated in FIG. 2 may store the BD address or the like instead of the MAC address. In the registration flow, the incoming call flow, or the outgoing call flow, the BD address or the like may be transmitted and received instead of the MAC address.

Note that the mobile phone communication unit 12, the communication control unit 11*a*, the incoming call control unit 11*b*, and the outgoing call control unit 11*c* may use various profiles of BLUETOOTH (registered trademark). For example, the outgoing call control unit 11c causes the mobile phone terminals a to f to perform the call-requesting outgoing call processing using Hands Free Profile (HFP). Note that the HFP is one of the profiles used for implementing BLUETOOTH (registered trademark), and is a profile for making an outgoing call, receiving an incoming call, and performing a call in the mobile phone terminals.

Although BLUETOOTH (registered trademark) is used as a communication method between the mobile phone terminals a to f and the mobile phone gateway 10, the present invention is not limited thereto, and another communication method may be used. For example, short-range wireless communication or the like other than BLUETOOTH (registered trademark) may be used.

Although the mobile phone number is used as the mobile identification information, the present invention is not limited thereto, and another identification information may be used. The MAC address, the BD address, the IP address, or the like may be used.

It goes without saying that the installation number of external telephone terminals G1, mobile phone terminals a to f, mobile phone gateways 10 and 20, and extension telephone terminals N1 to N3 can be changed as needed. For example, there may be more than one external telephone terminal G1, the number of mobile phone terminals a to f may be one, two, or four or more, the number of mobile phone gateways 10 and 20 may be one or three or more, and the number of extension telephone terminals N1 to N3 may be one, two, or four or more.

Figure 10:
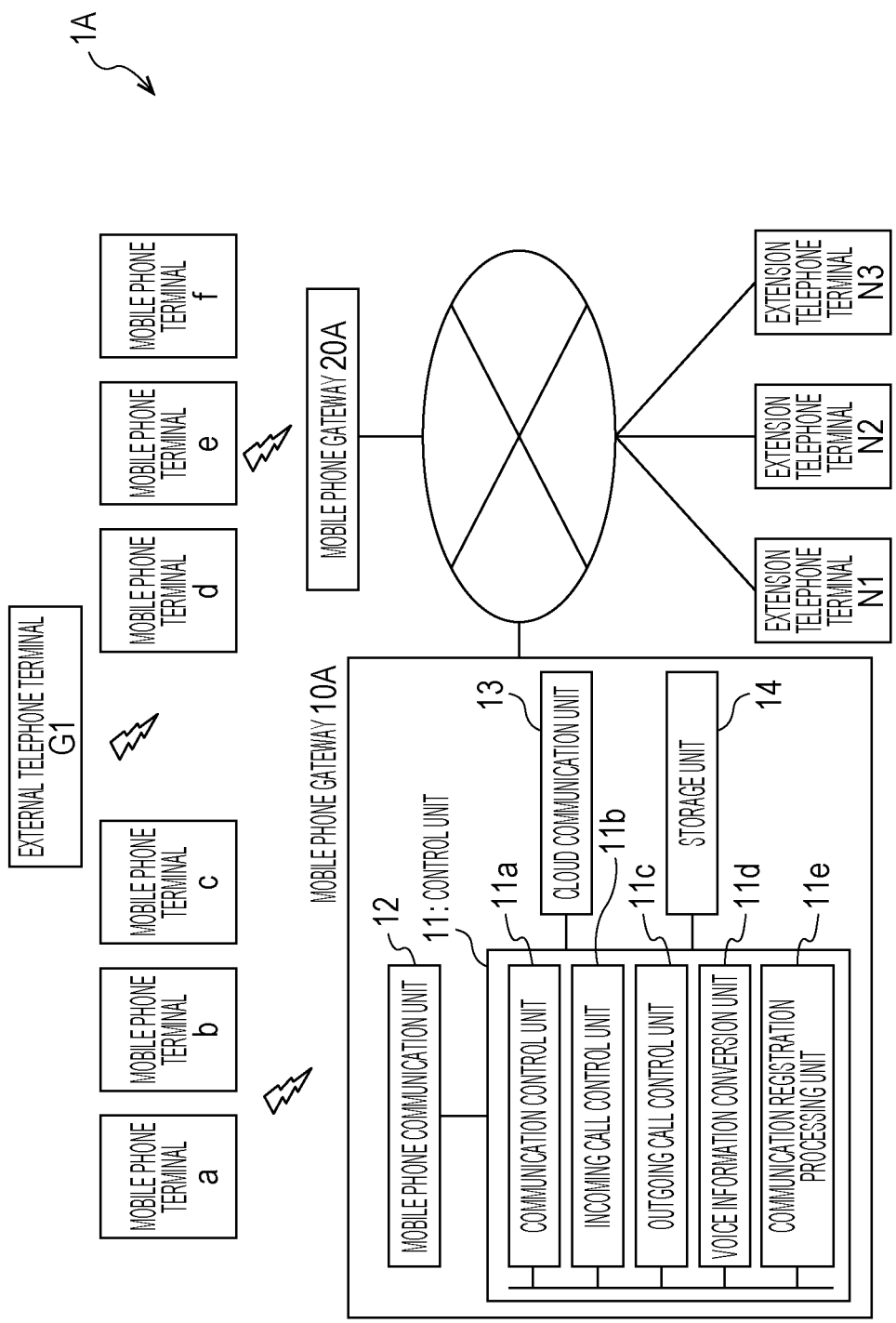
FIG. 10 is an overall configuration diagram illustrating a modification of the communication management system.

Although the mobile phone gateways 10 and 20 and the extension telephone management server 30 are provided as separate devices, a single communication management device may be provided with both the functions. Specifically, as illustrated in FIG. 10, a communication management system 1A includes the external telephone terminal G1, the mobile phone terminals a to f, mobile phone gateways 10A and 20A, and the extension telephone terminals N1 to N3. The storage units 14 of the mobile phone gateways 10A and 20A also function as the storage unit 33. The communication control units 11a also function as the extension communication control unit 31a, and the incoming call control units 11b also function as the extension incoming call control unit 31b. As a result, it is possible to not only provide the same effects as the communication management system 1 and the mobile phone gateways 10 and 20, but also combine the functions of the mobile phone gateways 10 and 20 and the extension telephone management server 30 into one.

The aforementioned respective functional units constituting the external telephone terminal G1, the mobile phone terminals a to f, the mobile phone gateways 10 and 20, the extension telephone management server 30, and the extension telephone terminals N1 to N3 may be provided in a single computer or distributed to a plurality of computers that can communicate via a communication network.

A program for realizing the functions of the communication management systems 1 and 1A and the mobile phone gateways 10, 10A, 20, and 20A may be recorded on a computer-readable recording medium, and the program recorded on this recording medium may be read by a computer system and executed to perform various processes. Note that the term "computer system" here includes an operating system and hardware such as peripheral equipment.

The "computer system" also includes a homepage provision environment (or display environment) in a case of using a WWW system.

In addition, the "computer-readable recording medium" means a storage device such as a portable medium including a hard disk, a flexible disk, an optical magnetic disk, a ROM, a CD-ROM, a DVD, and a USB (registered trademark) memory, and a hard disk built into the computer system. Furthermore, the "computer-readable recording medium" also includes those holding the program dynamically for a short period of time, such as a communication line in a case of transmitting the program via a network such as the Internet or lines of communication such as a telephone line, and those holding the program for a certain period of time, such as a volatile memory inside the computer system that serves as a server or a client in this case. In addition, the above program may be used to realize some of the aforementioned functions, or may also be used to realize the aforementioned functions in combination with programs already recorded in the computer system.

Regarding the aforementioned embodiment, the following notes are presented.

Note 1.

A communication management device that is connected between a mobile phone terminal connected to an external telephone terminal and an extension telephone terminal, and that causes the external telephone terminal and the extension telephone terminal to perform a call with each other via the mobile phone terminal, the communication management device comprising:

an incoming call control unit that transmits an extension incoming call instruction to the extension telephone terminal to cause the extension telephone terminal to perform incoming call processing when an external call request transmitted from the external telephone terminal is input to the mobile phone terminal to input a mobile incoming call instruction transmitted from the mobile phone terminal, and based on an incoming call response instruction transmitted from the extension telephone terminal, transmits the incoming call response instruction to the mobile phone terminal;

an outgoing call control unit that causes the mobile phone terminal to perform call-requesting outgoing call processing for the external telephone terminal based on an extension call request transmitted from the extension telephone terminal, and transmits an extension outgoing call response instruction to the extension telephone terminal when an external outgoing call response transmitted from the external telephone terminal is input to the mobile phone terminal to input a mobile outgoing call response instruction transmitted from the mobile phone terminal;

a voice information conversion unit that converts mobile voice information in the mobile phone terminal and extension voice information in the extension telephone terminal into each other; and a communication control unit that performs voice communication control between the external telephone terminal and the extension telephone terminal via the mobile phone terminal by causing the voice information conversion unit to convert the mobile voice information and the extension voice information into each other when the incoming call control unit or the outgoing call control unit establishes a call connection between the external telephone terminal and the extension telephone terminal.

Note 2.

The communication management device according to note 1, wherein
- a plurality of the mobile phone terminals and a plurality of the extension telephone terminals are provided,
- the incoming call control unit transmits the extension incoming call instruction to the extension telephone terminals to cause the extension telephone terminals to perform the incoming call processing when the mobile incoming call instruction transmitted from any of the mobile phone terminals is input, and based on the incoming call response instruction transmitted from any of the extension telephone terminals, transmits the incoming call response instruction to the mobile phone terminal that has transmitted the mobile incoming call instruction, and
- based on the extension call request, an external telephone number, and extension identification information transmitted from any of the extension telephone terminals, the outgoing call control unit extracts mobile identification information associated with the extension identification information to cause the mobile phone terminal identified by the mobile identification information to perform the call-requesting outgoing call processing, and transmits the extension outgoing call response instruction to the extension telephone terminal that has transmitted the extension call request, the external telephone number, and the extension identification information when the mobile outgoing call response instruction transmitted from the mobile phone terminal is input.

Note 3.

The communication management device according to note 1 or note 2, comprising
- a communication registration processing unit that performs communication registration processing with the mobile phone terminal, wherein
- when a BD address and mobile identification information transmitted from the mobile phone terminal are input, the communication registration processing unit stores the BD address and the mobile identification information in a mobile information storage unit in association with each other, and
- based on the extension call request and extension identification information transmitted from the extension telephone terminal, the outgoing call control unit extracts the mobile identification information from an extension information storage unit that stores the extension identification information and the mobile identification information in association with each other, extracts the BD address associated with the mobile identification information from the mobile information storage unit, and causes the mobile phone terminal corresponding to the BD address to perform the call-requesting outgoing call processing.

Note 4.

The communication management device according to note 3, wherein the communication registration processing unit extracts the mobile identification information from the extension information storage unit and stores the mobile identification information in the mobile information storage unit when a mobile identification information extraction instruction signal transmitted from the mobile phone terminal is input.

Note 5.

The communication management device according to note 4, wherein when a mobile identification information request transmitted from the mobile phone terminal is input, the communication registration processing unit extracts the mobile identification information stored in the mobile information storage unit and causes the mobile phone terminal to display the mobile identification information, and when the mobile identification information selectively input by a user operation is transmitted by the mobile phone terminal, the communication registration processing unit inputs and stores the mobile identification information in the mobile information storage unit in association with the BD address.

Note 6.

The communication management device according to note 5, wherein when the mobile identification information request transmitted from the mobile phone terminal is input, the communication registration processing unit determines whether the mobile identification information stored in the mobile information storage unit is associated with the BD address, extracts the mobile identification information not associated with the BD address, and causes the mobile phone terminal to display the mobile identification information.

Note 7.

A communication management method for a communication management device that is connected between a mobile phone terminal connected to an external telephone terminal and an extension telephone terminal, and that causes the external telephone terminal and the extension telephone terminal to perform a call with each other via the mobile phone terminal, the communication management method comprising:
- an incoming call control step of transmitting an extension incoming call instruction to the extension telephone terminal to cause the extension telephone terminal to perform incoming call processing when an external call request transmitted from the external telephone terminal is input to the mobile phone terminal to input a mobile incoming call instruction transmitted from the mobile phone terminal, and based on an incoming call response instruction transmitted from the extension telephone terminal, transmitting the incoming call response instruction to the mobile phone terminal;
- an outgoing call control step of causing the mobile phone terminal to perform call-requesting outgoing call processing for the external telephone terminal based on an extension call request transmitted from the extension telephone terminal, and transmitting an extension outgoing call response instruction to the extension telephone terminal when an external outgoing call response transmitted from the external telephone terminal is input to the mobile phone terminal to input a mobile outgoing call response instruction transmitted from the mobile phone terminal; and
- a communication control step of performing voice communication control between the external telephone terminal and the extension telephone terminal via the mobile phone terminal by causing a voice information conversion unit to convert mobile voice information and extension voice information into each other when a call connection between the external telephone terminal and the extension telephone terminal is established in the incoming call control step or the outgoing call control step.

Note 8.

A communication management program for a communication management device that is connected between a mobile phone terminal connected to an external telephone terminal and an extension telephone terminal, and that causes the external telephone terminal and the extension telephone terminal to perform a call with each other via the mobile phone terminal, the communication management program comprising:
- an incoming call control step of transmitting an extension incoming call instruction to the extension telephone terminal to cause the extension telephone terminal to perform incoming call processing when an external call request transmitted from the external telephone terminal is input to the mobile phone terminal to input a mobile incoming call instruction transmitted from the mobile phone terminal, and based on an incoming call response instruction transmitted from the extension telephone terminal, transmitting the incoming call response instruction to the mobile phone terminal;
- an outgoing call control step of causing the mobile phone terminal to perform call-requesting outgoing call processing for the external telephone terminal based on an extension call request transmitted from the extension telephone terminal, and transmitting an extension outgoing call response instruction to the extension telephone terminal when an external outgoing call response transmitted from the external telephone terminal is input to the mobile phone terminal to input a mobile outgoing call response instruction transmitted from the mobile phone terminal; and
- a communication control step of performing voice communication control between the external telephone terminal and the extension telephone terminal via the mobile phone terminal by causing a voice information conversion unit to convert mobile voice information and extension voice information into each other when a call connection between the external telephone terminal and the extension telephone terminal is established in the incoming call control step or the outgoing call control step.

Note 9.

A communication management system comprising:
a communication management device connected to a mobile phone terminal that communicates with an external telephone terminal; and
a communication management server connected between the communication management device and an extension telephone terminal,
the communication management system causing the external telephone terminal and the extension telephone terminal to perform a call with each other via the mobile phone terminal,
the communication management device comprising:
- an incoming call control unit that transmits an extension incoming call instruction to the communication management server when an external call request transmitted from the external telephone terminal is input to the mobile phone terminal to input a mobile incoming call instruction transmitted from the mobile phone terminal, and transmits an incoming call response instruction transmitted from an extension incoming call control unit of the communication management server to the mobile phone terminal when the incoming call response instruction is input;
- an outgoing call control unit that causes the mobile phone terminal to perform call-requesting outgoing call processing for the external telephone terminal when a call-requesting outgoing call instruction transmitted from an extension outgoing call control unit of the communication management server is input, and transmits an extension outgoing call response instruction to the communication management server when an external outgoing call response transmitted from the external telephone terminal is input to the mobile phone terminal to input a mobile outgoing call response instruction transmitted from the mobile phone terminal;
- a voice information conversion unit that converts mobile voice information in the mobile phone terminal and extension voice information in the extension telephone terminal into each other; and
- a communication control unit that performs voice communication control between the mobile phone terminal and the communication management server by causing the voice information conversion unit to convert the mobile voice information and the extension voice information into each other when the incoming call control unit or the outgoing call control unit establishes a call connection between the external telephone terminal and the extension telephone terminal, the communication management server comprising:
- the extension incoming call control unit that transmits the extension incoming call instruction transmitted from the incoming call control unit to the extension telephone terminal to cause the extension telephone terminal to perform incoming call processing when the extension incoming call instruction is input, and transmits the incoming call response instruction transmitted from the extension telephone terminal to the communication management device when the incoming call response instruction is input;
- the extension outgoing call control unit that transmits the call-requesting outgoing call instruction to the communication management device when an extension call request transmitted from the extension telephone terminal is input, and transmits the extension outgoing call response instruction transmitted from the outgoing call control unit to the extension telephone terminal when the extension outgoing call response instruction is input; and
- an extension communication control unit that performs voice communication control between the communication management device and the extension telephone terminal when the extension incoming call control unit or the extension outgoing call control unit establishes a call connection between the external telephone terminal and the extension telephone terminal.

REFERENCE SIGNS LIST 1, 1A Communication management system
10, 10A, 20, 20A Mobile phone gateway (Communication management device)
11a Communication control unit
11b Incoming call control unit
11c Outgoing call control unit
11d Voice information conversion unit
11e Communication registration processing unit
14 Storage unit (Mobile information storage unit)
30 Extension telephone management server (Communication management server)
31a Extension communication control unit
31b Extension incoming call control unit
31c Extension outgoing call control unit
33 Storage unit (Extension information storage unit)
a to f Mobile phone terminal G1 External telephone terminal
N1 to N3 Extension telephone terminal

The invention claimed is:

1. A communication management device that is connected between a mobile phone terminal connected to an external telephone terminal and an extension telephone terminal, and that causes the external telephone terminal and the extension telephone terminal to perform a call with each other via the mobile phone terminal, the communication management device comprising:
    an incoming call control unit configured to:
        transmit an extension incoming call instruction to the extension telephone terminal to cause the extension telephone terminal to perform incoming call processing in response to an external call request transmitted from the external telephone terminal being input to the mobile phone terminal to input a mobile incoming call instruction transmitted from the mobile phone terminal, and
        based on an incoming call response instruction transmitted from the extension telephone terminal, transmit the incoming call response instruction to the mobile phone terminal;
    an outgoing call control unit configured to:
        cause the mobile phone terminal to perform call-requesting outgoing call processing for the external telephone terminal based on an extension call request transmitted from the extension telephone terminal, and
        transmit an extension outgoing call response instruction to the extension telephone terminal in response to an external outgoing call response transmitted from the external telephone terminal being input to the mobile phone terminal to input a mobile outgoing call response instruction transmitted from the mobile phone terminal;
    a voice information conversion unit configured to convert mobile voice information in the mobile phone terminal and extension voice information in the extension telephone terminal into each other; and
    a communication control unit configured to perform voice communication control between the external telephone terminal and the extension telephone terminal via the mobile phone terminal by causing the voice information conversion unit to convert the mobile voice information and the extension voice information into each other in response to the incoming call control unit or the outgoing call control unit establishing a call connection between the external telephone terminal and the extension telephone terminal.

2. The communication management device according to claim 1, wherein
    a plurality of mobile phone terminals including the mobile phone terminal and a plurality of extension telephone terminals including the extension telephone terminal are provided,
    the incoming call control unit is configured to:
        transmit the extension incoming call instruction to the plurality of extension telephone terminals to cause the plurality of extension telephone terminals to perform the incoming call processing in response to the mobile incoming call instruction transmitted from any of the plurality of mobile phone terminals being input, and
        based on the incoming call response instruction transmitted from any of the plurality of extension telephone terminals, transmit the incoming call response instruction to the mobile phone terminal that has transmitted the mobile incoming call instruction, and
    the outgoing call control unit is configured to, based on the extension call request, an external telephone number, and extension identification information transmitted from any of the plurality of extension telephone terminals,
        extract mobile identification information associated with the extension identification information to cause the mobile phone terminal identified by the mobile identification information to perform the call-requesting outgoing call processing, and
        transmit the extension outgoing call response instruction to the extension telephone terminal that has transmitted the extension call request, the external telephone number, and the extension identification information in response to the mobile outgoing call response instruction transmitted from the mobile phone terminal being input.

3. The communication management device according to claim 1, further comprising:
    a communication registration processing unit configured to perform communication registration processing with the mobile phone terminal, wherein
    the communication registration processing unit is configured to, in response to a Bluetooth device (BD) address and mobile identification information transmitted from the mobile phone terminal being input, store the BD address and the mobile identification information in a mobile information storage unit in association with each other, and
    the outgoing call control unit is configured to, based on the extension call request and extension identification information transmitted from the extension telephone terminal,
        extract the mobile identification information from an extension information storage unit that stores the extension identification information and the mobile identification information in association with each other,
        extract the BD address associated with the mobile identification information from the mobile information storage unit, and
        cause the mobile phone terminal corresponding to the BD address to perform the call-requesting outgoing call processing.

4. The communication management device according to claim 3, wherein
    the communication registration processing unit is configured to, in response to a mobile identification information extraction instruction signal transmitted from the mobile phone terminal being input,
        extract the mobile identification information from the extension information storage unit and
        store the mobile identification information in the mobile information storage unit.

5. The communication management device according to claim 4, wherein
    the communication registration processing unit is configured to:
        in response to a mobile identification information request transmitted from the mobile phone terminal being input, extract the mobile identification information stored in the mobile information storage unit and cause the mobile phone terminal to display the mobile identification information, and in response to the mobile identification information selectively input by a user operation being transmitted by the mobile phone terminal, input and store the mobile identification information in the mobile information storage unit in association with the BD address.

6. The communication management device according to claim 5, wherein
the communication registration processing unit is configured to, in response to the mobile identification information request transmitted from the mobile phone terminal being input,
determine whether the mobile identification information stored in the mobile information storage unit is associated with the BD address,
extract the mobile identification information not associated with the BD address, and
cause the mobile phone terminal to display the mobile identification information.

7. A communication management method for a communication management device that is connected between a mobile phone terminal connected to an external telephone terminal and an extension telephone terminal, and that causes the external telephone terminal and the extension telephone terminal to perform a call with each other via the mobile phone terminal, the communication management method comprising:
an incoming call control step of transmitting an extension incoming call instruction to the extension telephone terminal to cause the extension telephone terminal to perform incoming call processing in response to an external call request transmitted from the external telephone terminal being input to the mobile phone terminal to input a mobile incoming call instruction transmitted from the mobile phone terminal, and based on an incoming call response instruction transmitted from the extension telephone terminal, transmitting the incoming call response instruction to the mobile phone terminal;
an outgoing call control step of causing the mobile phone terminal to perform call-requesting outgoing call processing for the external telephone terminal based on an extension call request transmitted from the extension telephone terminal, and transmitting an extension outgoing call response instruction to the extension telephone terminal in response to an external outgoing call response transmitted from the external telephone terminal being input to the mobile phone terminal to input a mobile outgoing call response instruction transmitted from the mobile phone terminal; and
a communication control step of performing voice communication control between the external telephone terminal and the extension telephone terminal via the mobile phone terminal by causing a voice information conversion unit to convert mobile voice information and extension voice information into each other in response to a call connection between the external telephone terminal and the extension telephone terminal being established in the incoming call control step or the outgoing call control step.

8. A non-transitory computer readable medium storing a communication management program for causing, when executed by a communication management device that is connected between a mobile phone terminal connected to an external telephone terminal and an extension telephone terminal, and that causes the external telephone terminal and the extension telephone terminal to perform a call with each other via the mobile phone terminal, the communication management device to execute:
an incoming call control step of transmitting an extension incoming call instruction to the extension telephone terminal to cause the extension telephone terminal to perform incoming call processing in response to an external call request transmitted from the external telephone terminal being input to the mobile phone terminal to input a mobile incoming call instruction transmitted from the mobile phone terminal, and based on an incoming call response instruction transmitted from the extension telephone terminal, transmitting the incoming call response instruction to the mobile phone terminal;
an outgoing call control step of causing the mobile phone terminal to perform call-requesting outgoing call processing for the external telephone terminal based on an extension call request transmitted from the extension telephone terminal, and transmitting an extension outgoing call response instruction to the extension telephone terminal in response to an external outgoing call response transmitted from the external telephone terminal being input to the mobile phone terminal to input a mobile outgoing call response instruction transmitted from the mobile phone terminal; and
a communication control step of performing voice communication control between the external telephone terminal and the extension telephone terminal via the mobile phone terminal by causing a voice information conversion unit to convert mobile voice information and extension voice information into each other in response to a call connection between the external telephone terminal and the extension telephone terminal being established in the incoming call control step or the outgoing call control step.

9. A communication management system comprising:
a communication management device configured to be connected to a mobile phone terminal that communicates with an external telephone terminal; and
a communication management server configured to be connected between the communication management device and an extension telephone terminal,
the communication management system configured to cause the external telephone terminal and the extension telephone terminal to perform a call with each other via the mobile phone terminal,
the communication management device comprising:
an incoming call control unit configured to
transmit an extension incoming call instruction to the communication management server in response to an external call request transmitted from the external telephone terminal being input to the mobile phone terminal to input a mobile incoming call instruction transmitted from the mobile phone terminal, and
transmit an incoming call response instruction transmitted from an extension incoming call control unit of the communication management server to the mobile phone terminal in response to the incoming call response instruction being input;
an outgoing call control unit configured to
cause the mobile phone terminal to perform call-requesting outgoing call processing for the external telephone terminal in response to a call-requesting outgoing call instruction transmitted from an extension outgoing call control unit of the communication management server being input, and transmit an extension outgoing call response instruction to the communication management server in response to an external outgoing call response transmitted from the external telephone terminal being input to the mobile phone terminal to input a mobile outgoing call response instruction transmitted from the mobile phone terminal;

a voice information conversion unit configured to convert mobile voice information in the mobile phone terminal and extension voice information in the extension telephone terminal into each other; and a communication control unit configured to perform voice communication control between the mobile phone terminal and the communication management server by causing the voice information conversion unit to convert the mobile voice information and the extension voice information into each other in response to the incoming call control unit or the outgoing call control unit establishing a call connection between the external telephone terminal and the extension telephone terminal, the communication management server comprising:

the extension incoming call control unit configured to transmit the extension incoming call instruction transmitted from the incoming call control unit to the extension telephone terminal to cause the extension telephone terminal to perform incoming call processing in response to the extension incoming call instruction being input, and transmit the incoming call response instruction transmitted from the extension telephone terminal to the communication management device in response to the incoming call response instruction being input;

the extension outgoing call control unit configured to transmit the call-requesting outgoing call instruction to the communication management device in response to an extension call request transmitted from the extension telephone terminal being input, and transmit the extension outgoing call response instruction transmitted from the outgoing call control unit to the extension telephone terminal in response to the extension outgoing call response instruction being input; and an extension communication control unit configured to perform voice communication control between the communication management device and the extension telephone terminal in response to the extension incoming call control unit or the extension outgoing call control unit establishing a call connection between the external telephone terminal and the extension telephone terminal.

10. The communication management device according to claim 2, further comprising a communication registration processing unit configured to perform communication registration processing with the mobile phone terminal, wherein the communication registration processing unit is configured to, in response to a Bluetooth device (BD) address and the mobile identification information transmitted from the mobile phone terminal being input, store the BD address and the mobile identification information in a mobile information storage unit in association with each other, and the outgoing call control unit is configured to, based on the extension call request and the extension identification information, extract the mobile identification information from an extension information storage unit that stores the extension identification information and the mobile identification information in association with each other, extract the BD address associated with the mobile identification information from the mobile information storage unit, and cause the mobile phone terminal corresponding to the BD address to perform the call-requesting outgoing call processing.

11. The communication management device according to claim 10, wherein the communication registration processing unit is configured to, in response to a mobile identification information extraction instruction signal transmitted from the mobile phone terminal being input, extract the mobile identification information from the extension information storage unit and store the mobile identification information in the mobile information storage unit.

12. The communication management device according to claim 11, wherein the communication registration processing unit is configured to:

in response to a mobile identification information request transmitted from the mobile phone terminal being input, extract the mobile identification information stored in the mobile information storage unit and cause the mobile phone terminal to display the mobile identification information, and in response to the mobile identification information selectively input by a user operation being transmitted by the mobile phone terminal, input and store the mobile identification information in the mobile information storage unit in association with the BD address.

13. The communication management device according to claim 12, wherein the communication registration processing unit is configured to, in response to the mobile identification information request transmitted from the mobile phone terminal being input, determine whether the mobile identification information stored in the mobile information storage unit is associated with the BD address, extract the mobile identification information not associated with the BD address, and cause the mobile phone terminal to display the mobile identification information.

* * * * *